(12) United States Patent
Tominaga et al.

(10) Patent No.: US 12,008,203 B2
(45) Date of Patent: Jun. 11, 2024

(54) DISPLAY DEVICE INCLUDING POSITION INPUT FUNCTION

(71) Applicant: SHARP KABUSHIKI KAISHA, Sakai (JP)

(72) Inventors: Masakatsu Tominaga, Sakai (JP); Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/215,500

(22) Filed: Jun. 28, 2023

(65) Prior Publication Data

US 2023/0341978 A1    Oct. 26, 2023

Related U.S. Application Data

(63) Continuation of application No. 17/868,385, filed on Jul. 19, 2022, now Pat. No. 11,740,745, which is a continuation of application No. 17/339,848, filed on Jun. 4, 2021, now Pat. No. 11,402,956, which is a continuation of application No. 16/491,997, filed as
(Continued)

(30) Foreign Application Priority Data

Mar. 17, 2017    (JP) ................. 2017-052573

(51) Int. Cl.
G06F 3/044        (2006.01)
G06F 3/041        (2006.01)

(52) U.S. Cl.
CPC .......... *G06F 3/0443* (2019.05); *G06F 3/0412* (2013.01); *G06F 3/0448* (2019.05)

(58) Field of Classification Search
None
See application file for complete search history.

(56) References Cited

U.S. PATENT DOCUMENTS

2010/0231551 A1    9/2010  Takano et al.
2012/0162109 A1    6/2012  Sasaki
(Continued)

FOREIGN PATENT DOCUMENTS

| JP | 2012-137562 A | 7/2012 |
| JP | 2015-122057 A | 7/2015 |
| WO | 2017/033759 A1 | 3/2017 |

OTHER PUBLICATIONS

Non-Final Office Action dated Apr. 4, 2022 for U.S. Appl. No. 17/339,848.
(Continued)

*Primary Examiner* — Duane N Taylor, Jr.
(74) *Attorney, Agent, or Firm* — ScienBiziP, P.C.

(57) ABSTRACT

A liquid crystal display device 10 includes pixel electrodes 11g that are spaced apart from each other, touch electrodes 14, each of which forms a capacitance with a finger, which is a position input body performing position input, to detect a position of input by the finger, which is the position input body, a touch line 15 that is sandwiched between adjacent pixel electrodes 11g and is connected to the touch electrodes 14, and at least two source lines 11j that extend parallel to the touch line 15. The source lines 11j transmit image signals to the pixel electrodes 11g. The source lines 11j are disposed such that one of the two pixel electrodes 11g is sandwiched between the touch line 15 and one of the two source lines 11j and another one of the two pixel electrodes 11g is sandwiched between another one of the two source lines 11j and the touch line 15.

15 Claims, 20 Drawing Sheets

Related U.S. Application Data application No. PCT/JP2018/009182 on Mar. 9, 2018, now Pat. No. 11,042,255.

(56) References Cited

U.S. PATENT DOCUMENTS

| | | |
|---|---|---|
| 2015/0109548 A1 | 4/2015 | Kim et al. |
| 2016/0019854 A1 | 1/2016 | Liu et al. |
| 2017/0168612 A1 | 6/2017 | Lee |
| 2018/0239476 A1 | 8/2018 | Yoshida et al. |

OTHER PUBLICATIONS

Notice of Allowance and Fee(s) Due dated Jun. 9, 2022 for U.S. Appl. No. 17/339,848.

Non-Final Office Action dated Jan. 17, 2023 for U.S. Appl. No. 17/868,385.

Notice of Allowance and Fee(s) Due dated Apr. 5, 2023 for U.S. Appl. No. 17/868,385.

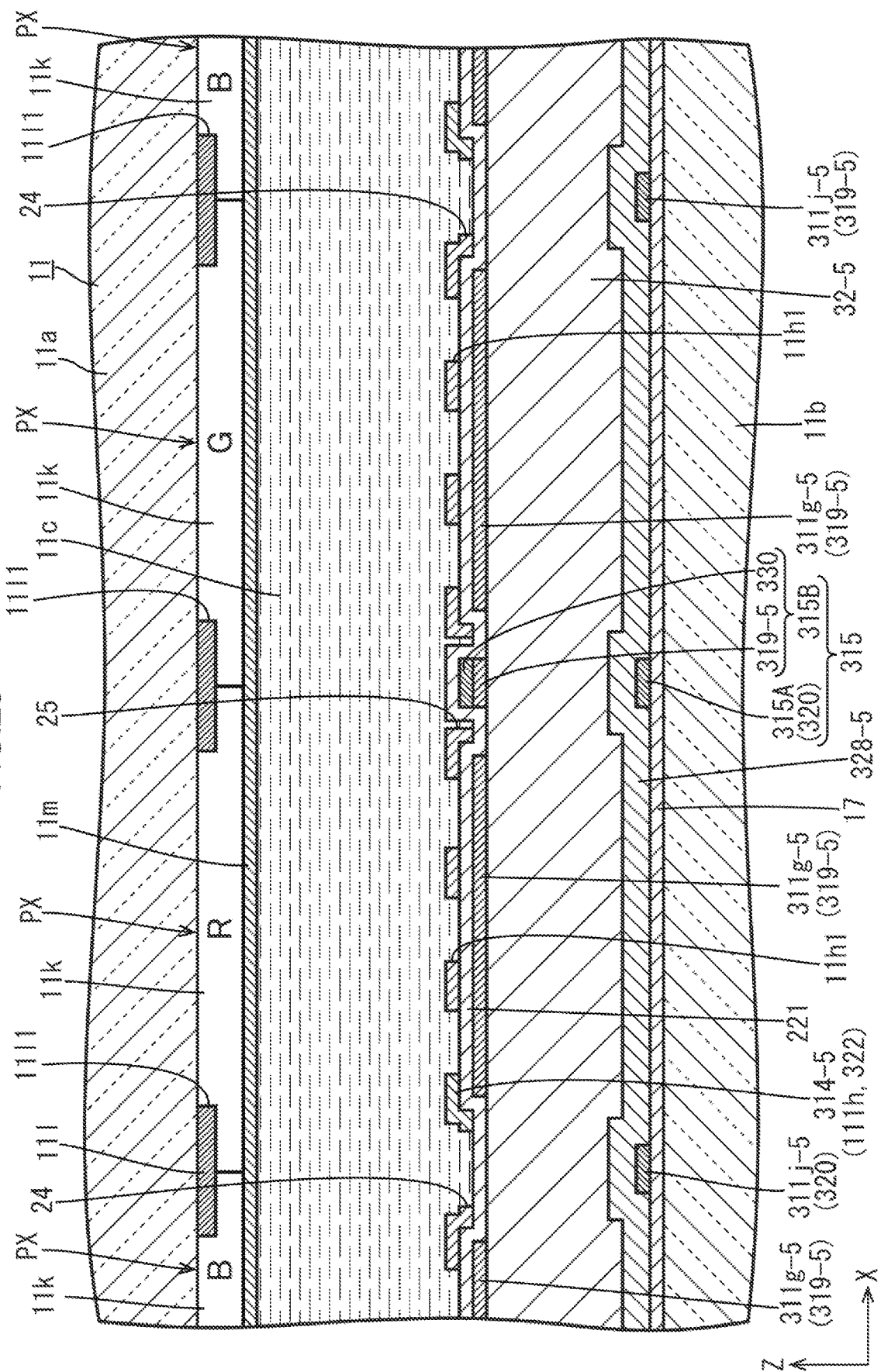

DISPLAY DEVICE INCLUDING POSITION INPUT FUNCTION

The present invention relates to a display device including a position input function. The present application is a continuation application of U.S. patent application Ser. No. 17/868,385, filed on Jul. 19, 2022, which is a continuation application of U.S. patent application Ser. No. 17/339,848, filed on Jun. 4, 2021, which is a continuation application of U.S. patent application Ser. No. 16/491,997, filed on Sep. 28, 2020, which is the National Stage of International Application No. PCT/JP2018/009182, filed Mar. 9, 2018, which claims priority from Japanese Application 2017-052573, the content of which is hereby incorporated by reference into this application.

TECHNICAL FIELD

Background Art

Conventionally, a touch screen panel integrated display device disclosed in Patent Document 1 has been known as an example of a touch screen panel integrated display device in which a touch screen panel is embedded in a display panel in an in-cell type. The touch screen panel integrated display device disclosed in Patent Document 1 includes: a panel that has data lines formed along a first direction, gate lines formed along a second direction, and electrodes grouped into electrode groups; a touch integrated circuit that applies a touch drive signal to all or some of the electrodes in a case where a driving mode is a touch driving mode; a data driving portion that supplies a data voltage to the data lines in a case where the driving mode is a display driving mode; and a gate driving portion that sequentially supplies a scan signal to the gate lines in the case where the driving mode is the display driving mode. The touch drive signal or a signal corresponding to the touch drive signal is applied to all or some of the gate lines in the case where the driving mode is the touch driving mode.

RELATED ART DOCUMENT

Patent Document

Patent Document 1: Japanese Unexamined Patent Application Publication No. 2015-122057

Problem to be Solved by the Invention

In the touch screen panel integrated display device described in Patent Document 1 described above, a data line to which a data voltage related to image display is supplied and a signal line to which a touch drive signal related to touch detection is supplied are arranged so as to overlap each other with a first protective layer interposed therebetween. For this reason, it becomes easy for a parasitic capacitance to be generated between the data line and the signal line, such that there was a possibility that sensitivity related to touch detection may be deteriorated or display quality may be deteriorated, for example, when displaying an intermediate gradation.

DISCLOSURE OF THE PRESENT INVENTION

The present invention has been completed on the basis of the above situation, and an object of the present invention is to improve sensitivity and display quality in position detection.

Means for Solving the Problem

A display device including a position input function according to the present invention includes: pixel electrodes spaced apart from each other; position detection electrodes, each of which is configured to form a capacitance with a position input body with which position input is performed to detect a position of the position input performed with the position input body; a position detection line sandwiched between two of the pixel electrodes adjacent to each other and connected to the position detection electrode; and at least two signal lines extending parallel to the position detection line to transmit image signals supplied to the pixel electrodes. The signal lines are disposed such that one of the two of the pixel electrodes is sandwiched between the position detection line and one of the signal lines and another one of the two of the pixel electrodes is sandwiched between the position detection line and another one of the two signal lines.

According to this configuration, the pixel electrodes are charged to potentials defined based on the image signals supplied through the signal lines and an image is display. On the other hand, the position detection electrodes form the capacitance with the position input body with which the position input is performed to detect the position of the input performed with the position input body based on a signal supplied through the position detection line.

Because the at least two signal lines are disposed such that one of the two of the pixel electrodes is sandwiched between the position detection line and one of the at least two signal lines and another one of the two of the pixel electrodes is sandwiched between the position detection line and another one of the at least two signal lines, the at least two signal lines do not to overlap the position detection line. Therefore, parasitic capacitances are less likely to appear between the position detection line and the signal lines, and thus sensitivity and display quality in position detection improve. In addition, because each of the signal lines is not sandwiched between the two pixel electrodes sandwiching the position detection line, the number of the signal lines and space for the signal lines are reduced in comparison to a configuration in which the signal lines are disposed adjacent to the pixel electrodes, respectively. According to the configuration, a high definition, a narrow frame, and a high aperture ratio are achieved.

Preferable embodiments of the present invention may have the following configurations.

(1) The display device with a position input function may further include a conductive film that includes sections from which at least sections of the position detection line and the signal lines are formed. According to this configuration, the at least sections of the position detection line and the signal lines can be provided through patterning of one conductive film. wherein comparison to a configuration in which the position detection line and the signal lines are provided through patterning of different conductive films, the number of photomasks required for the patterning can be reduced and thus a producing cost can be reduced.

(2) The conductive film may include at least a transparent electrode film from which the pixel electrodes are formed. According to this configuration, the pixel electrodes are provided through patterning of the transparent electrode film from which the the position detection line and the signal lines are formed. Thus, the number of photomasks required for the patterning can be further reduced and the producing cost can be further reduced.

(3) The display device with a position input function may further include a first transparent electrode film, a second transparent electrode film, and a metal film. The pixel electrodes or the position detection electrodes may be formed from the first transparent electrode film. The pixel electrodes or the position detection electrodes that are not formed from the first transparent electrode film may be formed from the second transparent electrode film. The second transparent electrode film may be disposed such that an inter-transparent electrode film insulating film is between the first transparent electrode film and the second transparent electrode film. The metal film may be disposed on an opposite side from the second transparent electrode film with respect to the first transparent electrode film such that an interlayer insulating film is between the first transparent electrode film and the metal film. The conductive film may include at least the metal film. According to this configuration, a distance between the position detection line and a corresponding one of the position detection electrodes and a distance between each of the signal lines and a corresponding one of the position detection electrodes are increased by a thickness of the interlayer insulating film in comparison to a configuration including the conductive film and the first transparent electrode film. Thus, a parasitic capacitance is less likely to appear between the position detection line and the corresponding position detection electrode or each of the signal lines and the corresponding position detection electrode and thus sensitivity and display quality in the position detection improve.

(4) The display device with a position input function may further include a common electrode that is disposed to at least partially overlap the pixel electrodes such that the inter-transparent electrode film insulating film is between the common electrode and the pixel electrodes. The common electrode may include divided sections configured as the position detection electrodes. The inter-transparent electrode film insulating film may have a thickness smaller than a thickness of the interlayer insulating film. According to this configuration, a distance between each of the pixel electrodes and the common electrode is reduced. Thus, an electric field generated between each of the pixel electrodes and the common electrode (particularly, an electric field in a horizontal direction with respect to a substrate in the liquid crystal display device in a horizontal electric field mode) is stronger. The display quality further improves. On the other hand, the interlayer insulating film has a thickness larger than the thickness of the inter-transparent electrode film insulating film such that a distance between the position detection line and the corresponding position detection electrode or between each of the signal lines and the position detection electrode is increased. Thus, a parasitic capacitance is further less likely to appear between the position detection line and the corresponding position detection electrode or between each of the signal lines and the corresponding position detection electrode. Therefore, the sensitivity and the display quality in the position detection further improve.

(5) The display device with a position input function may further include a first transparent electrode film, a second transparent electrode film, and a metal film. The pixel electrodes or the position detection electrodes may be formed from the first transparent electrode film. The pixel electrodes or the position detection electrodes that are not formed form the first transparent electrode film may be formed from the second transparent electrode film. The second transparent electrode film may be disposed such that an inter-transparent electrode film insulating film is between the first transparent electrode film and the second transparent electrode film. The metal film may be disposed on an opposite side from the second transparent electrode film with respect to the first transparent electrode film such that an interlayer insulating film is between the first transparent electrode film and the metal film. The first transparent electrode film may include a section from which at least a section of the position detection line is formed. The metal film may include sections from which at least sections of the signal lines are formed. According to this configuration, a distance between each of the signal lines and the position detection electrode is increased by a thickness of the interlayer insulating film in comparison to a configuration in which not only the section of the position detection line but also at least the sections of the signal lines are formed from the first transparent electrode film. According to the configuration, a parasitic capacitance is less likely to appear between each of the signal lines and the position detection electrode. Thus, sensitivity and display quality in the position detection further improve.

(6) The display device with a position input function may further include a first transparent electrode film, a second transparent electrode film, and a metal film. The pixel electrodes or the position detection electrodes may be formed from the first transparent electrode film. The pixel electrodes or the position detection electrodes that are not formed from the first transparent electrode film may be formed from the second transparent electrode film. The second transparent electrode film may be disposed such that an inter-transparent electrode film insulating film is between the first transparent electrode film and the second transparent electrode film. The metal film may be disposed on an opposite side from the second transparent electrode film with respect to the first transparent electrode film such that an interlayer insulating film is between the first transparent electrode film and the metal film. The metal film may may include sections from which at least sections of the signal lines are formed and a section from which a first position detection line included in the position detection line is formed. The first transparent electrode film may include a section from which a second position detection line is formed. The section is disposed to overlap the first position detection line included in the position detection line and connected to the first position detection line through a contact hole formed in the interlayer insulating film. According to this configuration, even if one of the first position detection line and the second position detection line is broken but the other one of the first position detection line and the second position detection line is not broken, the position detection line can exert its electrical function. Namely, this configuration is preferable for ensuring redundancy. Further, the first position detection line formed from the metal film and the second position detection line formed the first transparent electrode film overlap each other and the first position detection line and the second position detection line are connected to each other through the contact hole in the interlayer insulating film. Therefore, a line resistance of the position detection line can be reduced and thus sensitivity in the position detection further improves. At least the sections of the signal lines are formed from the second metal film. In comparison to a configuration in which at least sections of the signal lines are formed from the first transparent electrode film, a distance between each the signal lines and the position detection electrode is increased by a thickness of the interlayer insulating film. Thus, a parasitic capacitance is less likely to appear between each of the signal line and the position detection electrode and thus the sensitivity and the display quality in the position detection further improve.

(7) The display device with a position input function may further include scan lines and switching components. The scan lines extend to cross the signal lines and the position detection line to transmit scan signals. The switching components may be connected to the pixel electrodes, the signal lines, and the scan lines. The switching components may be driven according to the scan signals to charge the pixel electrodes to potentials defined based on the image signals. Every two of the scan lines may be sandwiched between the pixel electrodes adjacent to each other. The switching components may be spaced apart from and be parallel to each other. At least two of the switching components may be connected to the scan lines, respectively. The at least two of the switching elements may be connected to a corresponding one of the signal lines. The at least two of the switching components may be connected to at least two of pixel electrodes that sandwich the corresponding one of the signal lines. According to this configuration, when input timings of scan signals to the scan lines are shifted from each other and the image signals are input to the signal lines in synchronization with the input timings, the at least two of the switching components are driven at different timings. Further, the at least two of the pixel electrodes sandwiching each of the signal lines can be charged to the potentials defined based on the image signals input to the signal line at different timings.

(8) The display device with a position input function may further include a common electrode that is disposed to at least partially overlap the pixel electrodes such that an insulating film is between the common electrode and the pixel electrodes. The common electrode may include divided sections configured as the position detection electrodes. The common electrode may include partition openings by which the position detection electrodes adjacent to each other are separated from each other. At least sections of the partition openings in the common electrode may be between the two of the scan lines. According to this configuration, the partition openings are provided with effective use of space between the scan lines. Therefore, a high aperture ratio can be maintained in comparison to a configuration in which the partition openings are located to overlap the pixel electrodes. Further, this configuration is preferable for leveling parasitic capacitances between the common electrode and the scan lines to a configuration in which the partition openings overlap one of the scan lines but not overlap the other one of the scan lines. Further, according to the configuration, an electric field generated between each of the scan lines and the common electrode can be shielded by the common electrode. Therefore, disorder in alignment of the liquid crystal molecules is less likely to occur during control of the alignment of the liquid crystal molecules by the electric field between the common electrode and the pixel electrodes.

(9) The display device with a position input function may further include a common electrode that is disposed to at least partially overlap the pixel electrodes such that an insulating film is between the common electrode and the pixel electrodes. The common electrode may include divided sections configured as the position detection electrodes. The position detection line may be connected to the position detection electrodes through contact holes in the insulating film between the scan lines. The contact hole through wick one of the position detection electrodes, which is one of the divided sections of the common electrode, is connected to the position detection line is formed in the insulating film between the common electrode and the pixel electrode. According to the configuration, disorder tends to occur around the contact hole in alignment of the liquid crystal molecules when the alignment of the liquid crystal molecules is controlled by the electric field generated between the pixel electrode and the common electrode. Because the contact hole is located between the scan lines and away from the pixel electrode that contributes to image display, display failures due to the contact hole are less likely to occur and thus a high aperture ratio can be maintained.

(10) The position detection electrode may include signal line overlapping openings that overlap at least sections of the signal lines. In this configuration, the position detection electrode includes the signal line overlapping openings that overlap at least sections of the signal lines. Therefore, a parasitic capacitance between each of the signal lines and the position detection electrode can be reduced. Thus, the sensitivity and the display quality in the position detection further improve.

(11) The position detection electrodes may include position detection line overlapping openings that overlap at least sections of the position detection line. In this configuration, the position detection electrodes include the position detection line overlapping openings that overlap at least the sections of the position detection line. Therefore, a parasitic capacitance between the position detection line and each of the position detection electrodes can be reduced. Thus, the sensitivity in the position detection further improves.

(12) The display device with a position input function may further include a common electrode that is disposed to at least partially overlap the pixel electrodes such that an insulating film is between the common electrode and the pixel electrodes. The common electrode may include divided sections defined as the position detection electrodes. The common electrode may include partition openings by which the position detection electrodes adjacent to each other are separated from each other. The partition openings in the common electrode may overlap at least sections of the signal lines or the position detection line. In this configuration, the partition openings that separate the position detection electrodes adjacent to each other from each other overlap at least the sections of the signal lines or the position detection line. According to the configuration, parasitic capacitances between the signal lines and the position detection electrodes or parasitic capacitances between the position detection line and the position detection electrodes can be reduced. The parasitic capacitances can be reduced using the partition openings, which are existing structures. A higher aperture ratio can be maintained in comparison to a configuration in which the partition openings overlap the pixel electrodes but not overlap the signal lines or the position detection line.

(13) The partition openings in the common electrode may overlap at least the sections of the position detection lines. If the partition openings are located to overlap at least sections of the signal lines, the partition openings may not overlap both signal lines. That is, one of the signal lines may not overlap the partition openings resulting in unevenness in load of the signal lines. As described above, the partition openings overlap at least the sections of the position detection lines. Therefore, loads of the at least two signal lines can be maintained even. Thus, display failures such as luminance unevenness are less likely to occur and parasitic capacitances between the position detection line and the position detection electrodes can be reduced.

(14) The display device with a position input function may further include a display area, a non-display area, a driving circuit, signal lead lines, and position detection lead lines. At least the pixel electrodes, the position detection electrodes, the position detection lines, and the signal lines may be disposed in the display area to display an image. The non-display area may surround the display area. The driving circuit may be mounted in the non-display area. The signal lead lines may be disposed in the non-display area. The signal lead lines may include first ends connected to the signal lines and second ends connected to the driving circuit. The position detection lead lines may be disposed in the non-display area. The position detection lines may include first ends connected to the position detection lines and second ends connected to the driving circuit portion. The signal lead lines and the position detection lead lines may extend parallel to each other. According to this configuration, signals output from the driving circuit are transmitted to the signal lines through the signal lead lines and to the position detection lines through the position detection lead lines, respectively. Because the signal lead lines and the position detection lead lines extend parallel to each other not to cross each other in the middle, parasitic capacitances are less likely to appear between the signal lead lines and the position detection lead lines. Therefore, sensitivity and display quality in position detection improve.

Advantageous Effect of the Invention

According to the present invention, the sensitivity and the display quality in the position detection improve.

BRIEF DESCRIPTION OF THE DRAWINGS

FIG. 20 is a cross-sectional view taken along the vicinity of the center of a pixel portion in a liquid crystal panel according to another embodiment (5) of the present invention.

MODES FOR CARRYING OUT THE INVENTION

First Embodiment

A first embodiment of the present invention will be described with reference to FIGS. 1 to 6. In the present embodiment, a liquid crystal display device (display device with a position input function) 10 having a touch panel function (position input function) is exemplified. It should be noted that an X axis, a Y axis, and a Z axis are illustrated in a part of each drawing, and each axis direction is drawn to be a direction illustrated in each drawing. In addition, an upper side in FIGS. 3 to 6 is a front side, and a lower side in FIGS. 3 to 6 is a back side.

Figure 1:
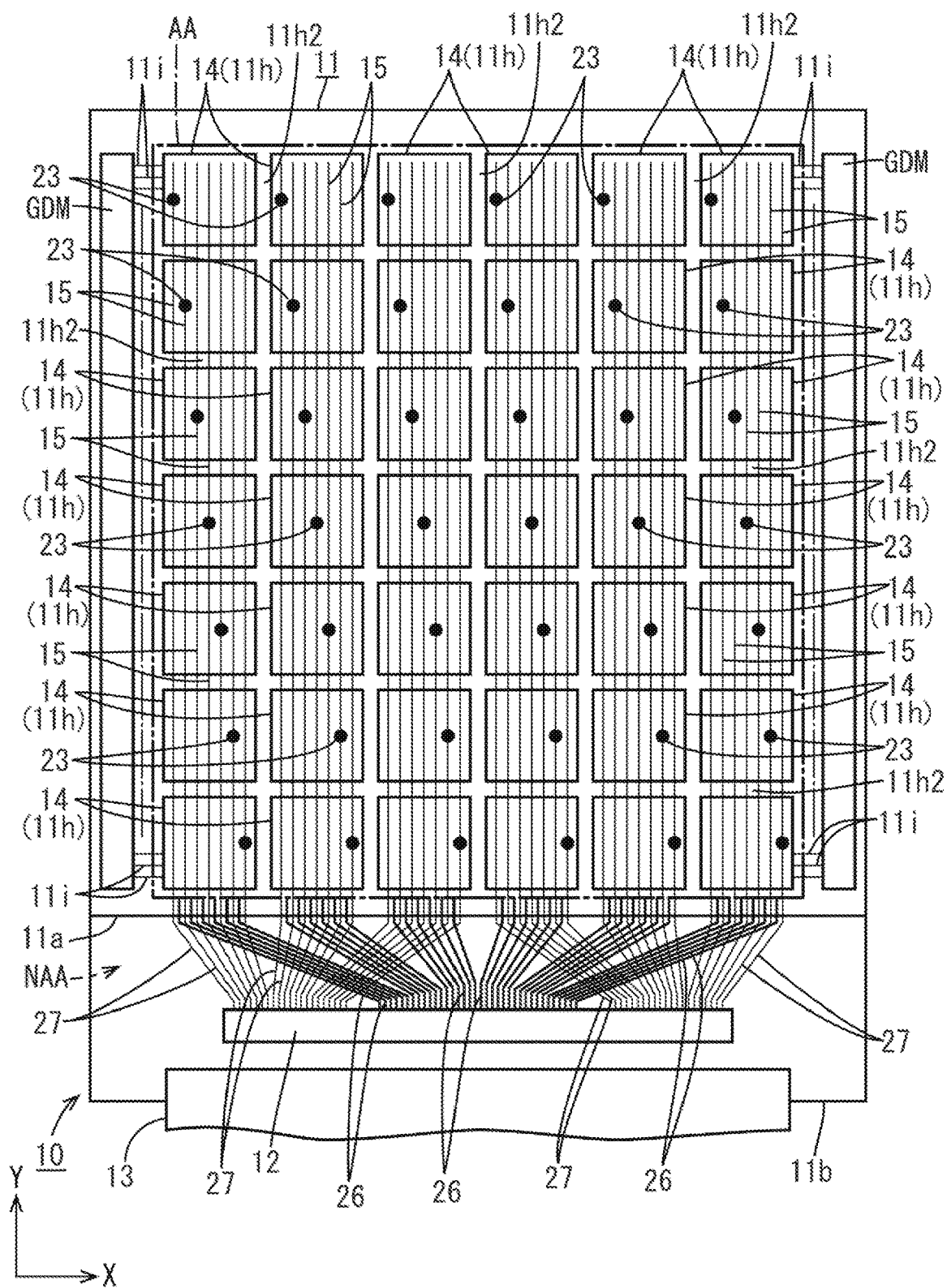
FIG. 1 is a plan view illustrating a plane arrangement of touch electrodes, touch lines, source lines, and the like, of a liquid crystal panel provided in a liquid crystal display device according to a first embodiment of the present invention.

The liquid crystal display device 10 includes at least a liquid crystal panel (display panel) 11 that can display an image, and a backlight device (lighting device) which is an external light source that irradiates the liquid crystal panel 11 with light for being used for display, as illustrated in FIG. 1. The backlight device is arranged on a back side (back surface side) with respect to the liquid crystal panel 11 and includes a light source (for example, a light emitting diode (LED)) that emits white light, an optical member that converts the light from the light source into planar light by imparting an optical action to the light from the light source, or the like. Note that illustration of the backlight device is omitted.

As illustrated in FIG. 1, in the liquid crystal panel 11, a central portion of a screen is a display area (a range surrounded by an alternate long and short dash line in FIG. 1) AA in which an image is displayed, while a frame-like outer peripheral portion surrounding the display area AA on the screen is a non-display area NAA in which the image is not displayed. A driver (driving circuit portion) 12 and a flexible substrate (signal transmission portion) 13 are mounted as components for supplying various signals related to a display function or a touch panel function, in the non-display area NAA of the liquid crystal panel 11. The driver 12 includes a large scale integration (LSI) chip having a driving circuit therein, is mounted in the non-display area NAA of the liquid crystal panel 11 in a chip on glass (COG) manner, and processes various signals transmitted by the flexible substrate 13. The flexible substrate 13 has a structure in which multiple line patterns (not illustrated) are formed on a substrate formed of a synthetic resin material (for example, a polyimide-based resin) having an insulating property and flexibility, and has one end connected to the non-display area NAA of the liquid crystal panel 11 and the other end connected to a control board (signal supply source) (not illustrated). Various signals supplied from the control board are transmitted to the liquid crystal panel 11 through the flexible substrate 13, are processed by the driver 12 in the non-display area NAA, and are then output to the display area AA.

Figure 3:
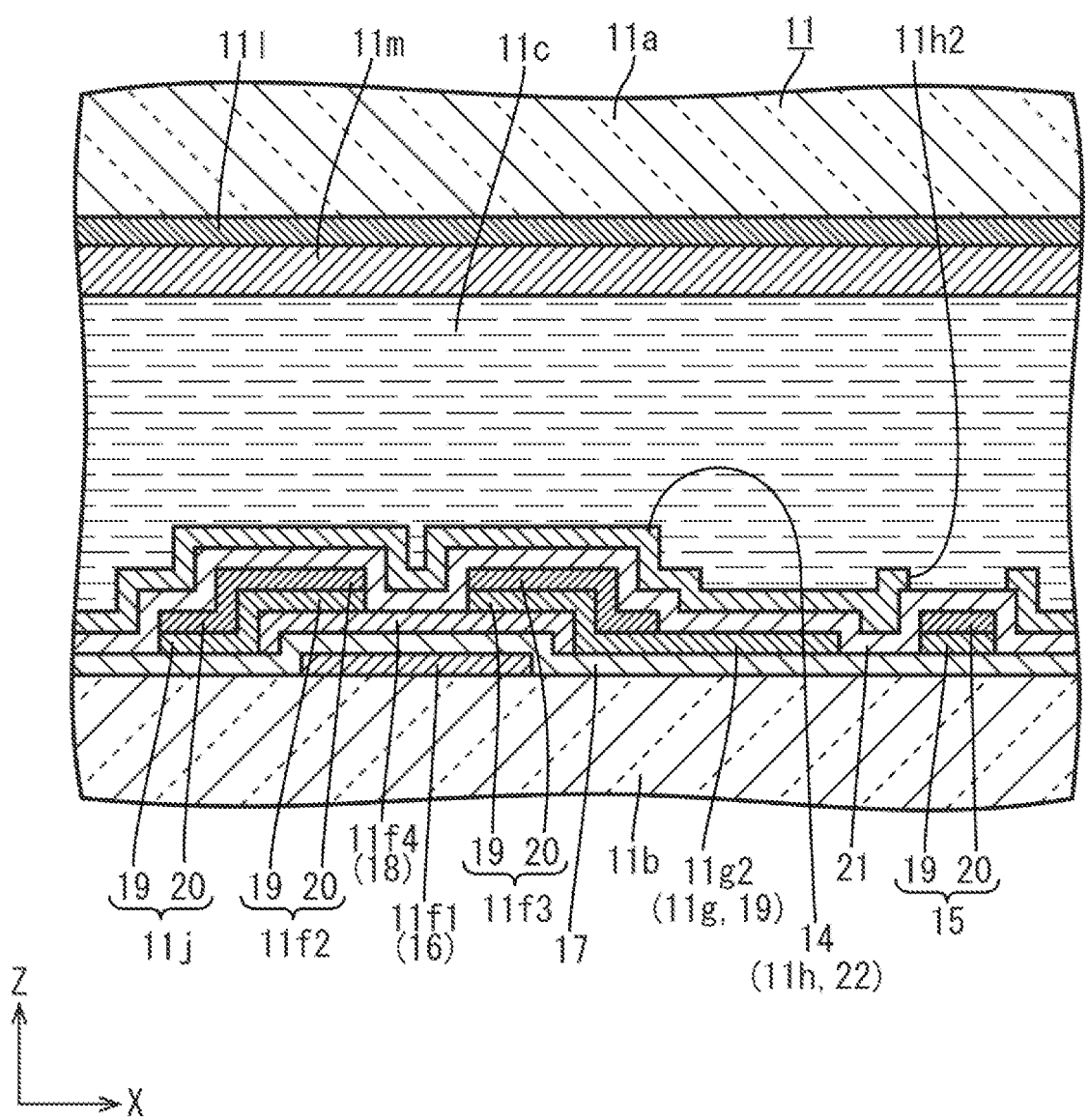
FIG. 3 is a cross-sectional view taken along line A-A in FIG. 2.

The liquid crystal panel 11 will be described in detail. The liquid crystal panel 11 includes a pair of substrates 11a and 11b and a liquid crystal layer (medium layer) 11c arranged in an internal space between both the substrates 11a and 11b and including liquid crystal molecules which are a material whose optical characteristics are changed as an electric field is applied, as illustrated in FIG. 3, and the liquid crystal layer 11c is surrounded and sealed by a seal portion (not illustrated) interposed between both the substrates 11a and 11b. A front side substrate (front surface side substrate) of the pair of substrates 11a and 11b is a color filter (CF) substrate (counter substrate) 11a, and a back side substrate (back surface side substrate) is an array substrate (active matrix substrate or component substrate) 11b. Both of the CF substrate 11a and the array substrate 11b are formed by laminating various films on an inner surface side of a glass substrate formed of glass. A negative liquid crystal is used as a liquid crystal material used for the liquid crystal layer 11c. Note that polarizing plates (not illustrated) are attached to outer surface sides of both the substrates 11a and 11b, respectively.

Figure 2:
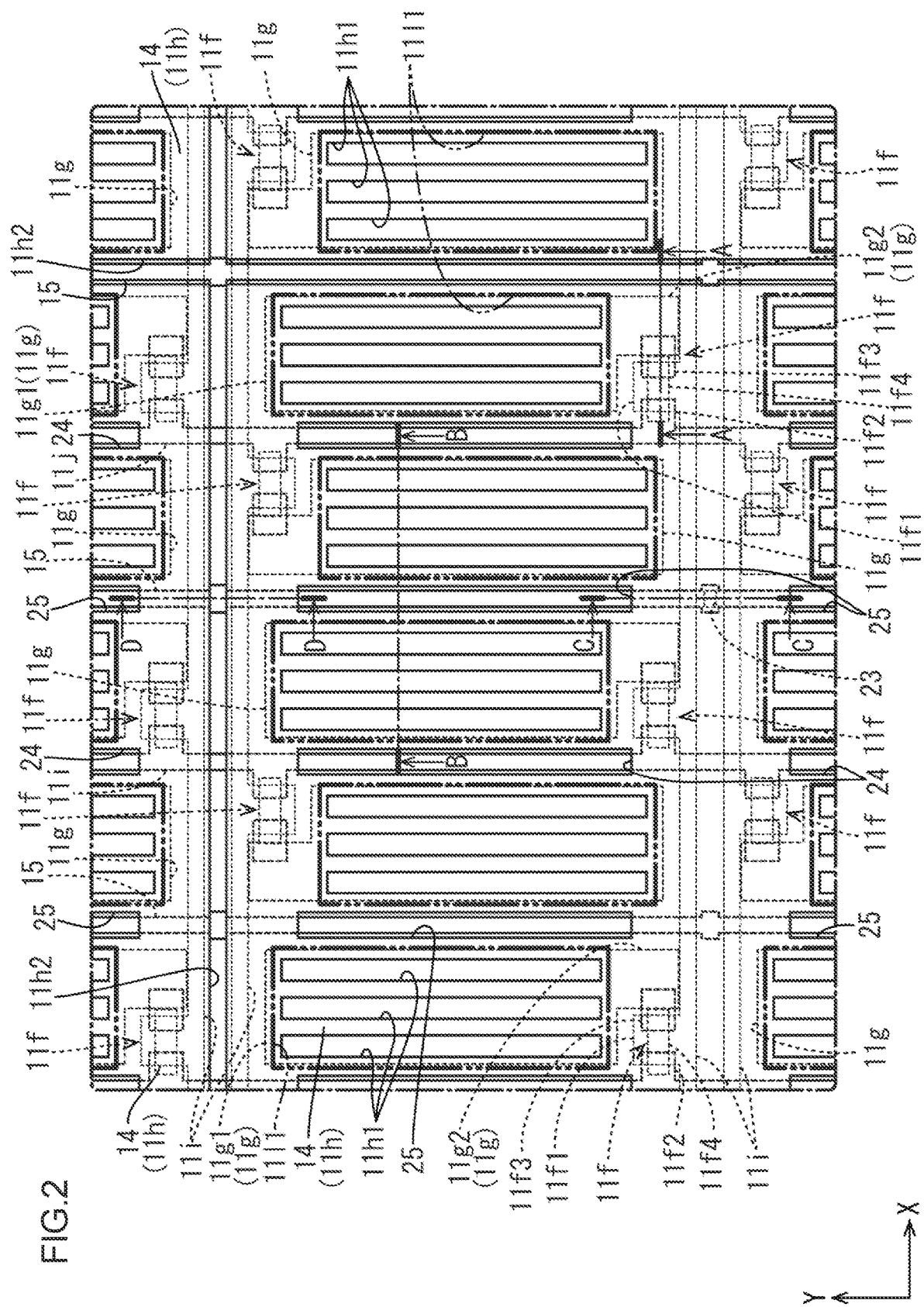
FIG. 2 is a plan view illustrating a pixel arrangement of an array substrate constituting a liquid crystal panel.

As illustrated in FIG. 2, multiple thin film transistors (TFTs) (switching components) 11f and multiple pixel electrodes 11g are provided in a matrix shape side by side along an X-axis direction and a Y-axis direction on an inner surface side (a side of the liquid crystal layer 11c or a surface side facing the CF substrate 11a) in the display area AA of the array substrate 11b. Gate lines (scan lines) 11i and source lines (signal lines or data lines) 11j orthogonal to (intersecting with) each other are arranged in the vicinity of these TFTs 11f and pixel electrodes 11g. The gate line 11i extends substantially straightly along the X-axis direction, while the source line 11j extends substantially straightly along the Y-axis direction. The gate line 11i and the source line 11j are connected to a gate electrode 11f1 and a source electrode 11f2 of the TFT 11f, respectively, and the pixel electrode 11g is connected to a drain electrode 11f3 of the TFT 11f. The TFT 11f is driven on the basis of various signals each supplied to the gate line 11i and the source line 11j, and the supply of a potential to the pixel electrode 11g is controlled according to the driving of the TFT 11f. The pixel electrode 11g has a plane shape of a vertically long substantially rectangular shape, and a short side direction of the pixel electrode 11g coincides with an extending direction of the gate line 11i and a long side direction thereof coincides with an extending direction of the source line 11j. An arrangement or the like of the TFT 11f, the pixel electrode 11g, the gate line 11i, and the source line 11j will be described again later. In addition, the non-display area NAA of the array substrate 11b is provided with a gate circuit portion GDM for supplying a scan signal to the gate line 11i, as illustrated in FIG. 1.

Figure 4:
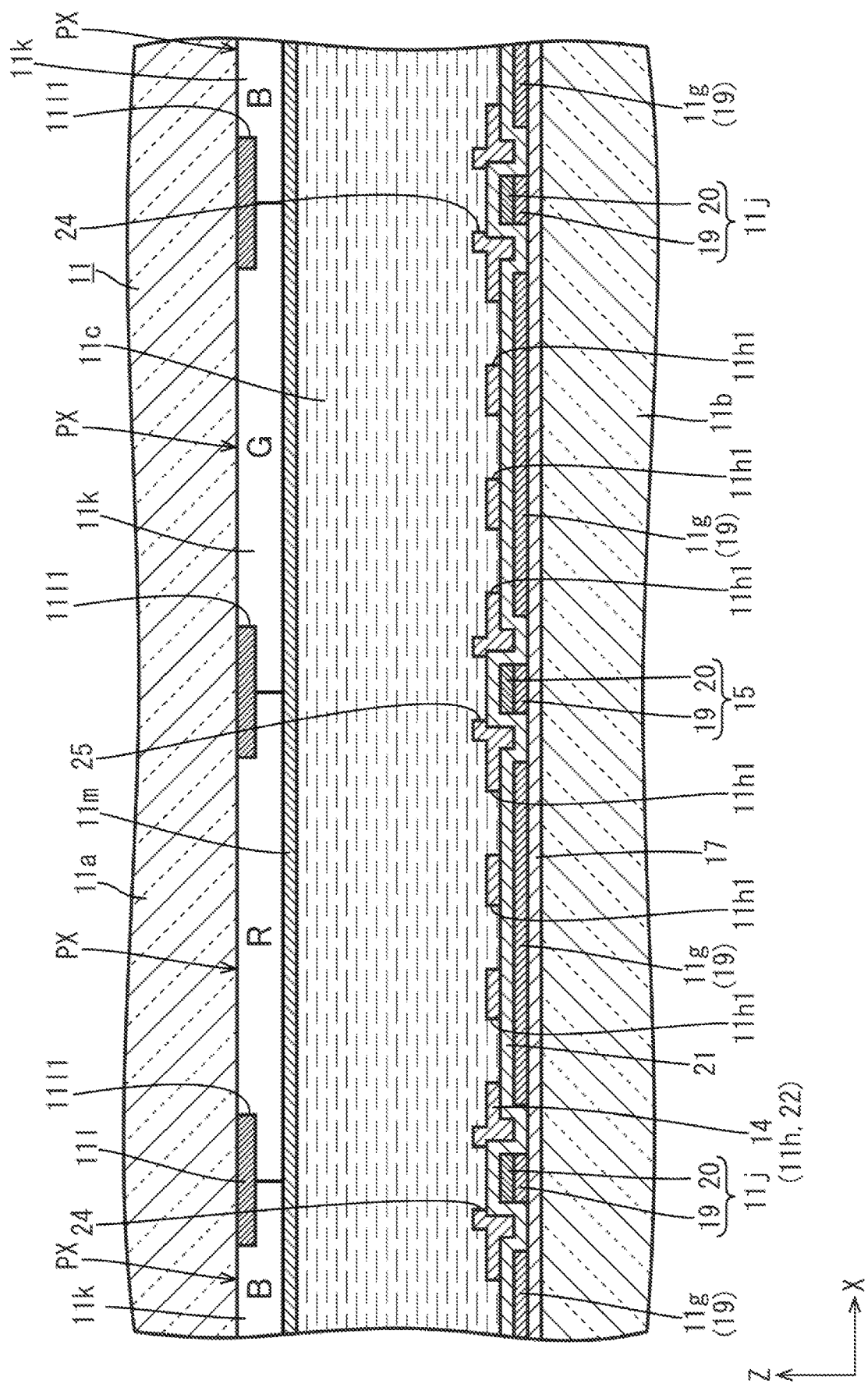
FIG. 4 is a cross-sectional view taken along line B-B in FIG. 2.

As illustrated in FIGS. 2 and 4, a common electrode 11h is formed on an upper layer side (side close to the liquid crystal layer 11c) above the pixel electrodes 11g so as to overlap all the pixel electrodes 11g, on the inner surface side of the display area AA of the array substrate 11b. The common electrode 11h is always supplied with a substantially constant reference potential and extends over substantially the entire display area AA, and multiple (three in FIG. 2) pixel overlapping openings (pixel overlapping slits or alignment control slits) 11h1 extending along a long side direction of the respective pixel electrodes 11g are opened and formed in portions of the common electrode 11h overlapping the respective pixel electrodes 11g (pixel electrode bodies high to be described in detail later). When a potential difference is generated between the pixel electrode 11g and the common electrode 11h overlapping each other as the pixel electrode 11g is charged, a fringe electric field (oblique electric field) including a component in a normal direction to a plate surface of the array substrate 11b in addition to a component along the plate surface of the array substrate 11b is generated between an opening edge of the pixel overlapping opening 11h1 and the pixel electrode 11g, and an alignment state of the liquid crystal molecules included in the liquid crystal layer 11c can thus be controlled using the fringe electric field. That is, an operation mode of the liquid crystal panel 11 according to the present embodiment is a fringe field switching (FFS) mode. Note that a case where the number of pixel overlapping openings 11h1 is three has been exemplified in the present embodiment, but if at least one pixel overlapping opening 11h1 is provided, it is possible to exert an alignment control function and a display function. In addition, an extending direction of the pixel overlapping openings 11h1 is not limited to one direction, and the pixel overlapping openings 11h1 may be bent in a "V" shape within one pixel portion PX or the pixel overlapping openings 11h1 may extend in different directions in pixel portions PX adjacent to each other in the Y-axis direction.

As illustrated in FIG. 4, three color filters 11k exhibiting blue (B), green (G), and red (R) are provided in the display area AA on an inner surface side of the CF substrate 11a. The multiple color filters 11k exhibiting different colors are repeatedly arranged along the gate lines 11i (X-axis direction), and extend along the source lines 11j (approximately the Y-axis direction), such that they are arranged in a stripe shape as a whole. These color filters 11k are arranged so as to overlap the respective pixel electrodes 11g on a side of the array substrate 11b when viewed in a plane. The color filters 11k adjacent to each other in the X-axis direction and exhibiting the different colors are arranged such that a boundary (color boundary) therebetween overlaps the source line 11j and a light blocking portion 11l to be described below. In the liquid crystal panel 11, the R, G, B color filters 11k arranged along the X-axis direction and three pixel electrodes 11g each facing the color filters 11k constitute three-color pixel portions PX, respectively. In the liquid crystal panel 11, display pixels configured to display a color having a predetermined gradation are configured by the three-color pixel portions PX of R, G, and B adjacent to each other along the X-axis direction. An arrangement pitch of the pixel portions PX in the X-axis direction is, for example, about 10 μm to 30 μm.

As illustrated in FIGS. 2 and 4, a light blocking portion (inter-pixel light blocking portion or black matrix) 11l blocking light is formed in the display area AA on the inner surface side of the CF substrate 11a. The light blocking portion 111 has a plane shape of a substantially lattice shape so as to partition between adjacent pixel portions PX (pixel electrodes 11g), and has pixel openings 111I at positions overlapping most of the pixel electrodes 11g on a side of the array substrate 11b when viewed in a plane. The multiple pixel openings 111I are arranged side by side in a matrix shape along the X-axis direction and the Y-axis direction within a plate surface of the CF substrate 11a. The pixel opening 111I has a plane shape of a vertically long substantially rectangular shape according to an external shape of the pixel electrode 11g, and a short side dimension of the pixel opening 111I is larger than that of the pixel electrode 11g, but a long side dimension thereof is slightly smaller than that of the pixel electrode 11g. The pixel opening 111I can transmit light, such that display on the pixel portion PX becomes possible. The light blocking portion 111 functions to prevent light from passing between the adjacent pixel portions PX to ensure independence of gradations of each pixel portion PX, and particularly a portion of the light blocking portion 111 extending along the source line 11j prevents color mixture between the pixel portions PX exhibiting the different colors. The light blocking portion 111 is arranged so as to overlap at least the gate line 11i and the source line 11j (also including a touch line 15 to be described later) on a side of the array substrate 11b when viewed in a plane. A planarizing film 11m flatly arranged over substantially the entire area of the CF substrate 11a is provided on an upper layer side (a side of the liquid crystal layer 11c) of the color filter 11k. Note that alignment films (not shown) for aligning the liquid crystal molecules included in the liquid crystal layer 11c are formed, respectively, on the innermost surfaces of both the substrates 11a and 11b in contact with the liquid crystal layer 11c.

The liquid crystal panel 11 according to the present embodiment has both of a display function for displaying an image and a touch panel function (position input function) for detecting a position (input position) input by a user on the basis of the displayed image, and a touch panel pattern for exerting the touch panel function of these functions is integrated (configured in an in-cell type) within the liquid crystal panel 11. This touch panel pattern is configured in a so-called projection-type capacitive manner, and a detection manner of the touch panel pattern is a self-capacitance manner. As illustrated in FIG. 1, the touch panel pattern is provided on the array substrate 11b of the pair of substrates 11a and 11b, and includes touch electrodes (position detection electrodes) 14 arranged side by side in a matrix shape within the plate surface of the array substrate 11b. The touch electrodes 14 are arranged in the display area AA of the array substrate 11b. Therefore, the display area AA in the liquid crystal panel 11 substantially coincides with a touch area (position input area) in which the input position can be detected, and the non-display area NAA in the liquid crystal panel 11 substantially coincides with a non-touch area (non-position input area) in which the input position cannot be detected. When the user brings his/her finger (position input body) (not illustrated), which is a conductor, close to a front surface (display surface) of the liquid crystal panel 11 in order to perform position input on the basis of an image of the display area AA of the liquid crystal panel 11 visually recognized by him/her, a capacitance is formed between the finger and the touch electrode 14. Thus, as the finger becomes close to the touch electrode 14, a capacitance detected by a touch electrode 14 close to the finger is changed to be different from that of a touch electrode 14 distant from the finger, and it is thus possible to detect the input position on the basis of such a difference.

The touch electrodes 14 are constituted by the common electrode 11h provided on the array substrate 11b, as illustrated in FIG. 1. The common electrode 11h includes a partition opening (partition slit) 11h2 partitioning between adjacent touch electrodes 14, in addition to the pixel overlapping openings 11h1 described above. The partition opening 11h2 includes a portion traversing the entire length of the common electrode 11h along the X-axis direction and a portion traversing the entire length of the common electrode 11h along the Y-axis direction to have a substantially lattice shape as a whole when viewed in a plane. The common electrode 11h includes the touch electrodes 14 divided in a grid pattern when viewed in a plane by the partition opening 11h2 and electrically independent from each other. The touch electrodes 14 formed by partitioning the common electrode 11h by the partition opening 11h2 are arranged side by side in a matrix shape along the X-axis direction and the Y-axis direction in the display area AA. The touch electrode 14 has a substantially rectangular shape when viewed in a plane, and a dimension of one side of the touch electrode 14 is about several mm (for example, about 2 to 4 mm). Therefore, a size of the touch electrode 14 when viewed in a plane is much larger than that of the pixel portion PX (pixel electrode 11g), such that the touch electrode 14 is arranged in a range over multiple (for example, about several tens or several hundreds of) pixel portions PX in the X-axis direction and the Y-axis direction. Touch lines (position detection lines) 15 provided on the array substrate 11b are selectively connected to the touch electrodes 14. The touch lines 15 are orthogonal to (intersect with) the gate lines 11i on the array substrate 11b, extend along the Y-axis direction so as to be parallel to the source lines 11j, and are selectively connected to specific touch electrodes 14 of the touch electrodes 14 arranged along the Y-axis direction. Further, the touch lines 15 are connected to a detection circuit (not illustrated). The detection circuit may be provided in the driver 12, but may be provided outside the liquid crystal panel 11 through the flexible substrate 13. The touch lines 15 supply a reference potential signal related to a display function and a touch signal (position detection signal) related to a touch function to the touch electrodes 14 at different timings. The reference potential signal of these signals is transmitted to all the touch lines 15 at the same timing, such that all the touch electrodes 14 become a reference potential to function as the common electrode 11h. In addition, the touch line 15 has the same line width as that of the source line 11j. Note that FIG. 1 schematically illustrates an arrangement of the touch electrodes 14, and the specific number and an arrangement of touch electrodes 14 can be appropriately changed in addition to those illustrated.

Figure 5:
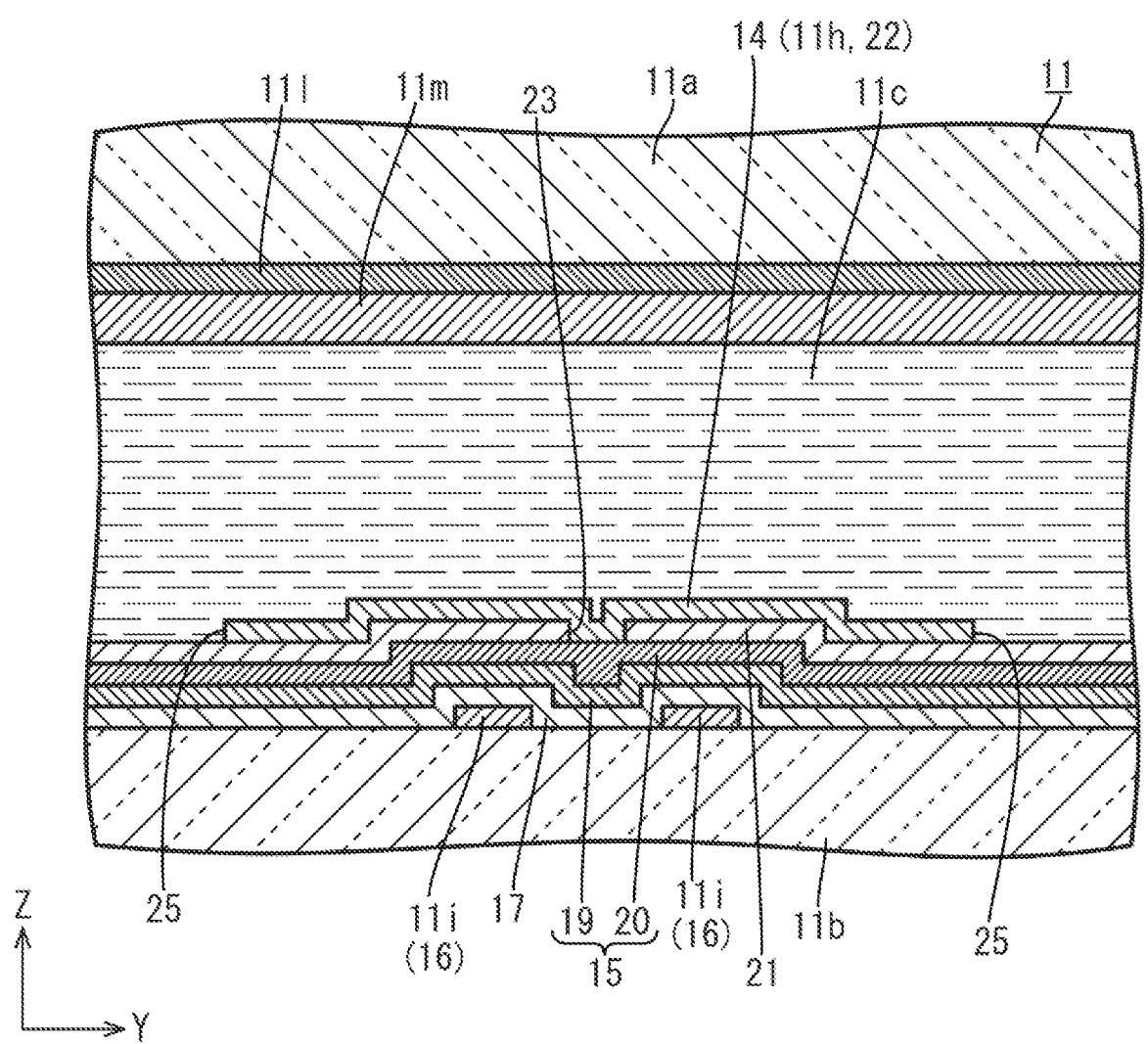
FIG. 5 is a cross-sectional view taken along line C-C in FIG. 2.

A connection structure between the touch electrode 14 and the touch line 15 will be described. The touch line 15 is connected to the touch electrode 14, which is a target to be connected, through a contact hole 23 opened and formed in an inter-transparent electrode film insulating film 21, as illustrated in FIG. 5. Although the touch lines 15 extend approximately along the Y-axis direction so as to traverse all the touch electrodes 14, the touch lines 15 are selectively connected only to specific touch electrodes 14 by a plane arrangement of the contact hole 23. Therefore, a touch line 15, which is a target to be connected, and touch lines 15, which are not the target to be connected, are arranged on the touch electrode 14 so as to overlap each other with the inter-transparent electrode film insulating film 21 interposed therebetween.

Here, various films laminated on the inner surface side of the array substrate 11b will be described. In the array substrate 11b, as illustrated in FIG. 3, a first metal film 16, a gate insulating film 17, a semiconductor film 18, a first transparent electrode film (a conductive film or a transparent electrode film) 19, a second metal film (a conductive film or a metal film) 20, an inter-transparent electrode film insulating film (insulating film) 21, and a second transparent electrode film 22 are laminated sequentially from a lower layer side (side of a glass substrate). Each of the first metal film 16 and the second metal film 20 is a single layer film formed of one type of metal material or a laminate film or an alloy formed of different types of metal materials selected from the group consisting of copper, titanium, aluminum, and the like, to have conductivity and a light blocking property. The first metal film 16 constitutes the gate line 11i, the gate electrode 11f1 of the TFT 11f, or the like. The second metal film 20 constitutes parts of the source line 11j and the touch line 15, parts of the source electrode 11f2 and the drain electrode 11f3 of the TFT 11f, or the like. Each of the gate insulating film 17 and the inter-transparent electrode film insulating film 21 is formed of an inorganic material such as silicon nitride ($SiN_x$), silicon oxide ($SiO_2$) or the like. The gate insulating film 17 maintains the first metal film 16 of a lower layer side and the semiconductor film 18, the first transparent electrode film 19, and the second metal film 20 of an upper layer side in an insulating state. The inter-transparent electrode film insulating film 21 maintains the semiconductor film 18, the first transparent electrode film 19, the second metal film 20 of a lower layer side and the second transparent electrode film 22 of an upper layer side in an insulating state. The semiconductor film 18 is composed of a thin film using, for example, an oxide semiconductor, amorphous silicon or the like as a material, and constitutes a channel portion (semiconductor portion) 11f4 connected to the source electrode 11f2 and the drain electrode 11f3 in the TFT 11f. The first transparent electrode film 19 and the second transparent electrode film 22 are formed of a transparent electrode material (for example, indium tin oxide (ITO) or the like). The first transparent electrode film 19 constitutes parts of the pixel electrode 11g or the source line 11j and the touch line 15, parts of the source electrode 11f2 and the drain electrode 11f3 of the TFT 11f, or the like. The second transparent electrode film 22 constitutes the common electrode 11h (touch electrode 14) or the like.

Configurations of the TFT 11f and the pixel electrode 11g will be described in detail. The TFT 11f includes the gate electrode 11f1 branched from the gate line 11i, as illustrated in FIGS. 2 and 3. The gate electrode 11f1 is formed by protruding a portion of the gate line 11i adjacent to the source line 11j toward the pixel electrode 11g, which is a target to be connected, along the Y-axis direction, and has a substantially rectangular shape when viewed in a plane. The gate electrode 11f1 drives the TFT 11f on the basis of the scan signal supplied to the gate line 11i, such that a current between the source electrode 11f2 and the drain electrode 11f3 is controlled. The TFT 11f has a source electrode 11f2 branched from the source line 11j. The source electrode 11f2 is formed by protruding a portion of the source line 11j adjacent to the gate line 11i toward the pixel electrode 11g, which is a target to be connected, along the X-axis direction, and a projecting tip portion of the source line 11j overlaps the gate electrode 11f1 and is connected to the channel portion 11f4. The TFT 11f has the drain electrode 11f3 arranged at a position spaced apart from the source electrode 11f2. The drain electrode 11f3 has a substantially rectangular shape in which it extends in parallel with the source electrode 11f2, and one end of the drain electrode 11f3 faces the source electrode 11f2 to overlap the gate electrode 11f1 and be connected to the channel portion 11f4, while the other end of the drain electrode 11f3 is connected to the pixel electrode 11g. The source electrode 11f2 and the drain electrode 11f3 have a laminated structure of the first transparent electrode film 19 and the second metal film 20, and the first transparent electrode film 19 of a lower layer side of the laminated structure is in direct contact with the channel portion 11f4 composed of the semiconductor film 18. On the other hand, the other end of the drain electrode 11f3 is directly connected to the pixel electrode 11g (contact portion 11g2) composed of the first transparent electrode film 19.

The pixel electrode 11g includes a pixel electrode body 11g1 overlapping the pixel opening 11I1 of the light blocking portion 11I and having a substantially rectangular shape and a contact portion 11g2 protruding from the pixel electrode body 11g1 to the TFT 11f along the Y-axis direction, as illustrated in FIGS. 2 and 3, and the contact portion 11g2 of the pixel electrode body high and the contact portion 11g2 is connected to the drain electrode 11f3. The TFT 11f overlaps the gate electrode 11f1 with the gate insulating film 17 interposed therebetween, and has the channel portion 11f4 connected to the source electrode 11f2 and the drain electrode 11f3. The channel portion 11f4 extends along the X-axis direction so as to traverse the gate electrode 11f1, and has one end connected to the source electrode 11f2 and the other end connected to the drain electrode 11f3. When the TFT 11f becomes a turn-on state on the basis of a scan signal supplied to the gate electrode 11f1, an image signal (a signal or a data signal) supplied to the source line 11j is supplied from the source electrode 11f2 to the drain electrode 11f3 through the channel portion 11f4 composed of the semiconductor film 18. As a result, the pixel electrode 11g is charged with a potential based on the image signal.

Next, an arrangement of the source line 11j and the touch line 15 will be described in detail. The source line 11j and the touch line 15 are each arranged so as to extend along the Y-axis direction and be sandwiched between pixel electrodes 11g adjacent to each other in the X-axis direction (direction orthogonal to (intersecting with) an extending direction of the source line 11j and the touch line 15, as illustrated in FIG. 2. The source lines 11j and the touch lines 15 are alternately and repeatedly arranged side by side with one pixel electrode 11g sandwiched therebetween in the X-axis direction. In detail, the source lines 11j are arranged with two pixel electrodes 11g sandwiched therebetween in the X-axis direction, while the touch lines 15 are arranged with two pixel electrodes 11g sandwiched therebetween in the X-axis direction and with being offset from the source lines 11j so as to be spaced apart from the source lines 11j by one pixel electrode 11g in the X-axis direction. Therefore, at least two source lines 11j are arranged such that two pixel electrodes 11g sandwiching the touch line 15 from both sides in the X-axis direction are each sandwiched between the at least two source lines 11j and the touch line 15. Similarly, at least two touch lines 15 are arranged such that two pixel electrodes 11g sandwiching the source line 11j from both sides in the X-axis direction are each sandwiched between the at least two touch lines 15 and the source line 11j. According to such a configuration, since the source line 11j and the touch line 15 do not overlap each other and are arranged in a non-overlapping manner, a situation in which a parasitic capacitance is generated between the source line 11j and the touch line 15 can be suitably avoided. Thus, it is difficult for dullness to occur in the image signal transmitted by the source line 11j or the touch signal transmitted by the touch line 15. Therefore, sensitivity related to the position detection is improved, and, for example, occurrence of shadowing at an intermediate gradation is suppressed, such that display quality is improved. In addition, since the source line 11*j* is not sandwiched between the two pixel electrodes 11*g* sandwiching the touch line 15, the number and an arrangement space of the source lines 11*j* are reduced to about half as compared with a case where the source lines are individually arranged adjacent to the respective pixel electrodes 11*g*. Thus, a high definition, a narrow frame, a high aperture ratio, and the like, are achieved.

As the source line 11*j* is arranged as described above, the source line 11*j* transmits the image signal supplied to each of the pixel electrodes 11*g* adjacent to each other in the X-axis direction, as illustrated in FIG. 2. That is, the image signal transmitted to the source line 11*j* is supplied to each of a group (group including pixel electrodes 11*g* arranged along the extending direction of the source line 11*j* to form a column shape) of two columns of pixel electrodes 11*g* adjacent to the source line 11*j* on the left and right sides in the X-axis direction. In order to transmit the image signal transmitted to the source line 11*j* to each of the pixel electrodes 11*g* adjacent to the source line 11*j* in the X-axis direction, the gate line 11*i* and the TFT 11*f* are arranged as follows. That is, a pair of gate lines 11*i* are arranged so as to be sandwiched between the pixel electrodes 11*g* adjacent to each other in the Y-axis direction. Therefore, each pixel electrode 11*g* is sandwiched between a pair of gate lines 11*i* arranged on one side thereof in the Y-axis direction and a pair of gate lines 11*i* arranged on the other side thereof in the Y-axis direction. The pair of gate lines 11*i* are arranged in a space (area) provided between the pixel electrodes 11*g* adjacent to each other in the Y-axis direction so as to be spaced apart from each other in the Y-axis direction and be parallel to each other. The space provided between the pixel electrodes 11*g* adjacent to each other in the Y-axis direction is larger than a dimension obtained by adding each line width of the pair of gate lines 11*i* and an interval provided between the pair of gate lines 11*i* to each other. Thus, the gate lines 11*i* and the pixel electrodes 11*g* are arranged so as not to overlap each other.

A pair of gate electrodes 11*f*1 connected to each of the pair of gate lines 11*i* protrude from each gate line 11*i* in directions in which they are distant from each other in the Y-axis direction, as illustrated in FIG. 2. The gate electrode 11*f*1 connected to one gate line 11*i* of the pair of gate lines 11*i* and the gate electrode 11*f*1 connected to the other gate line 11*i* of the pair of gate lines 11*i* are arranged to be offset with respect to the X-axis direction, and are arranged such that the source line 11*j* is sandwiched therebetween. On the other hand, a pair of source electrodes 11*f*2 connected to the source line 11*j* are arranged at positions (offset position in the Y-axis direction) sandwiching the pair of gate lines 11*i* in the Y-axis direction, and are provided so as to protrude in opposite directions along the X-axis direction. Therefore, a pair of TFTs 11*f* each including the pair of gate electrodes 11*f*1 and the pair of source electrodes 11*f*2 are arranged so as to be each connected to a pair of pixel electrodes 11*g* diagonally adjacent to each other with intersection places between the pair of gate lines 11*i* and the source line 11*j* interposed therebetween. In other words, the pair of TFTs 11*f* are at least arranged so as to be connected to each of the pair of gate lines 11*i*, the source line 11*j*, and the pair of pixel electrodes 11*g* arranged so as to sandwich the source line 11*j* in the X-axis direction. With the arrangement of the TFT 11*f* as described above, the pixel electrodes 11*g* adjacent to each other in the X-axis direction are arranged to be inverted with respect to each other in the Y-axis direction. Specifically, arrangements of the contact portions 11*g*2 with respect to the pixel electrode bodies 11*g*1 in the Y-axis direction are opposite to each other. For this reason, the pixel electrode bodies 11*g*1 adjacent to each other in the X-axis direction and groups of the pixel overlapping opening 11*h*1 overlapping the pixel electrode bodies 11*g*1 are arranged in a zigzag shape. According to the configuration as described above, for example, by making input timings of the scan signals different between one gate line 11*i* and the other gate line 11*i*, it is possible to drive one TFT 11*f* and the other TFT 11*f* at different timings. By inputting an image signal for one TFT 11*f* and an image signal for the other TFT 11*f* to the source line 11*j* in synchronization with the input timings of the scan signals, it is possible to charge one pixel electrode 11*g* connected to one TFT 11*f* and the other pixel electrode 11*g* connected to the other TFT 11*f* with potentials based on each image signal, respectively.

Both of the source line 11*j* and the touch line 15 that sandwich the pixel electrode 11*g* in the X-axis direction have a laminated structure of the first transparent electrode film 19 and the second metal film 20, as illustrated in FIG. 4. Therefore, in producing the array substrate 11*b*, in order to form the source line 11*j* and the touch line 15, it is sufficient to pattern the common first transparent electrode film 19 and second metal film 20 sequentially laminated on an upper layer side of the gate insulating film 17 and the semiconductor film 18. Here, as compared with a case where the touch line and the source line are provided, respectively, by patterning different transparent electrode films or metal films, photomasks or the like required for the patterning can be reduced, and a producing cost can thus be reduced. In addition, the source line 11*j* and the touch line 15 have the laminated structure of the first transparent electrode film 19 and the second metal film 20, such that it is possible to reduce a line resistance. Furthermore, since it is possible to cause the source line 11*j* and the touch line 15 to have redundancy, it is possible to reduce a probability of occurrence of a disconnection. In addition, since the first transparent electrode film 19 constituting parts of the source line 11*j* and the touch line 15 also constitutes the pixel electrode 11*g*, in producing the array substrate 11*b*, in order to form the pixel electrode 11*g*, it is sufficient to pattern the source line 11*j*, the touch line 15, and the common first transparent electrode film 19. Thus, the photomasks or the like required for the patterning can be further reduced, and a producing cost can thus be further reduced.

More specifically, in the present embodiment, in producing the array substrate 11*b*, the pixel electrode 11*g*, the source line 11*j*, and the touch line 15 can be patterned using a single photomask. That is, in order to pattern the pixel electrode 11*g*, the source line 11*j*, and the touch line 15, the first transparent electrode film 19 and the second metal film 20 are successively formed, the photoresist is formed, and exposure is then performed using a halftone mask (not illustrated). The halftone mask has a transmissive area transmitting exposed light irradiated from an exposure device with a transmittivity of substantially 100%, a transflective area transmitting the same exposed light with a transmittivity of, for example, about 10% to 70%, and a light blocking area blocking the same exposed light. Here, the transmissive area or the light blocking area is arranged so as to overlap a formation range of the source line 11*j* and the touch line 15 and the transflective area is arranged so as to overlap a formation range of the pixel electrode 11*g*, when viewed in a plane. When etching is performed after performing the exposure using such a halftone mask, portions where both of the first transparent electrode film 19 and the second metal film 20 remain become the source line 11*j* and the touch line 15, and a portion where only the first transparent electrode film 19 remains becomes the pixel electrode 11*g*. As described above, the pixel electrode 11*g*, the source line 11*j*, and the touch line 15 can be patterned using the single photomask, which is extremely suitable for achieving a reduction in a producing cost.

The touch electrode 14 (common electrode 11*h*) composed of the second transparent electrode film 22 is provided with a source line overlapping opening (signal line overlapping opening) 24 arranged so as to overlap at least a part of the source line 11*j* and a touch line overlapping opening (position detection line overlapping opening) 25 arranged so as to overlap at least a part of the touch line 15, as illustrated in FIGS. 2 and 4. The source line overlapping opening 24 and the touch line overlapping opening 25 extend in parallel with the Y-axis direction, which is the extending direction of the source line 11*j* and the touch line 15, respectively, and have a vertically long shape (longitudinal shape having the extending direction of the source line 11*j* and the touch line 15 as a longitudinal direction) when viewed in a plane. In addition, the source line overlapping opening 24 and the touch line overlapping opening 25 have a width dimension (dimension in the X-axis direction) larger than that of the source line 11*j* or the touch line 15 and equal to that of the pixel overlapping opening 11*h*1 of the common electrode 11*h*. As such, by arranging the source line overlapping opening 24 so as to overlap at least a part of the source line 11*j*, a parasitic capacitance that can be generated between the source line 11*j* and the touch electrode 14 is reduced, and by arranging the touch line overlapping opening 25 so as to overlap at least a part of the touch line 15, a parasitic capacitance that can be generated between the touch line 15 and the touch electrode 14 that is not connected to the touch line 15 is reduced. Thus, the sensitivity and the display quality related to the position detection are further improved. In addition, there is a possibility that an electric field will be generated between an opening edge of the source line overlapping opening 24 in the touch electrode 14 and the source line 11*j* and the alignment state of the liquid crystal material included in the liquid crystal layer 11*c* will be disordered due to the electric field, but in the present embodiment, since the liquid crystal material is the negative liquid crystal, it is difficult for the alignment disorder of the liquid crystal material due to the electric field described above to occur, and in particular, it is difficult for a defect such as light leakage at the time of black display to occur.

The source line overlapping opening 24 and the touch line overlapping opening 25 (excluding a partition opening 11*h*2 to be described later) have a length dimension (a dimension in the Y-axis direction) shorter than that of the pixel electrode 11*g* and equal to that of the pixel overlapping opening 11*h*1 of the common electrode 11*h*, as illustrated in FIG. 2. The source line overlapping opening 24 and the touch line overlapping opening 25 (excluding a partition opening 11*h*2 to be described later) are arranged to be aligned with each other in the Y-axis direction and are also arranged to be approximately aligned with each pixel overlapping opening 11*h*1 in the Y-axis direction. In more detail, the source line overlapping opening 24 and the touch line overlapping opening 25 are arranged so as to be in the vicinity of the center of the pixel electrode 11*g* (on a side distant from the gate line 11*i*) with respect to each pixel overlapping opening 11*h*1 arranged in a zigzag shape in the Y-axis direction. According to such a configuration, as compared with a case where the source line overlapping opening and the touch line overlapping opening are arranged so as not to be aligned with the pixel overlapping opening 11*h*1 in the Y-axis direction, it is possible to efficiently arrange the source line overlapping opening 24, the touch line overlapping opening 25, and the pixel overlapping opening 11*h*1, and it is possible to reduce electrical resistance values related to the touch electrodes 14 formed by dividing the common electrode 11*h*.

In the common electrode 11*h*, a part of the partition opening 11*h*2 partitioning between the adjacent touch electrodes 14 function as at least either one of the source line overlapping opening 24 and the touch line overlapping opening 25, as illustrated in FIGS. 2 and 3. That is, a portion extending along the Y-axis direction, which is a part of the partition opening 11*h*2, is arranged so as to overlap the source line 11*j* or the touch line 15. Note that a case where a part of the partition opening 11*h*2 overlaps the touch line 15 to constitute the touch line overlapping opening 25 has been representatively exemplified in FIGS. 2 and 3, but a part of the partition opening 11*h*2 may also overlap the source line 11*j* to constitute the source line overlapping opening 24. Portions of the partition opening 11*h*2 constituting the source line overlapping opening 24 and the touch line overlapping opening 25 extend over the entire length of the display area AA in the Y-axis direction, and thus overlap substantially the entire lengths of the source line 11*j* or the touch line 15. As such, the parasitic capacitance that can be generated between the source line 11*j* and the touch electrode 14 or the parasitic capacitance that can be generated between the touch line 15 and the touch electrode 14 that is not connected to the touch line 15 can be reduced using the partition opening 11*h*2, which is an existing structure. In addition, an aperture ratio can be kept high as compared with a case where the partition opening are arranged so as not to overlap the source line 11*j* or the touch line 15 and so as to overlap the pixel electrode 11*g*. Preferably, in the present embodiment, a part (portion extending along the Y-axis direction) of the partition opening 11*h*2 selectively overlaps the touch line 15 and does not overlap the source line 11*j*. Here, in a case where a part of the partition opening is arranged so as to overlap at least some of the source lines 11*j*, since an installation interval of the partition opening is much wider than that of the source lines 11*j*, the partition opening is not arranged so as to overlap all the multiple source lines 11*j*. Therefore, source lines 11*j* that do not overlap the partition opening among the multiple source lines 11*j* are generated. As a result, there is a possibility that loads of each source line 11*j* will become non-uniform. In that respect, as described above, a part of the partition opening 11*h*2 is arranged so as to selectively overlap some of the multiple touch lines 15 and does not overlap all the source lines 11*j*, and loads of the multiple source lines 11*j* can thus be kept uniform. Thus, it is possible to suppress a display defect such as luminance unevenness or the like.

Figure 6:
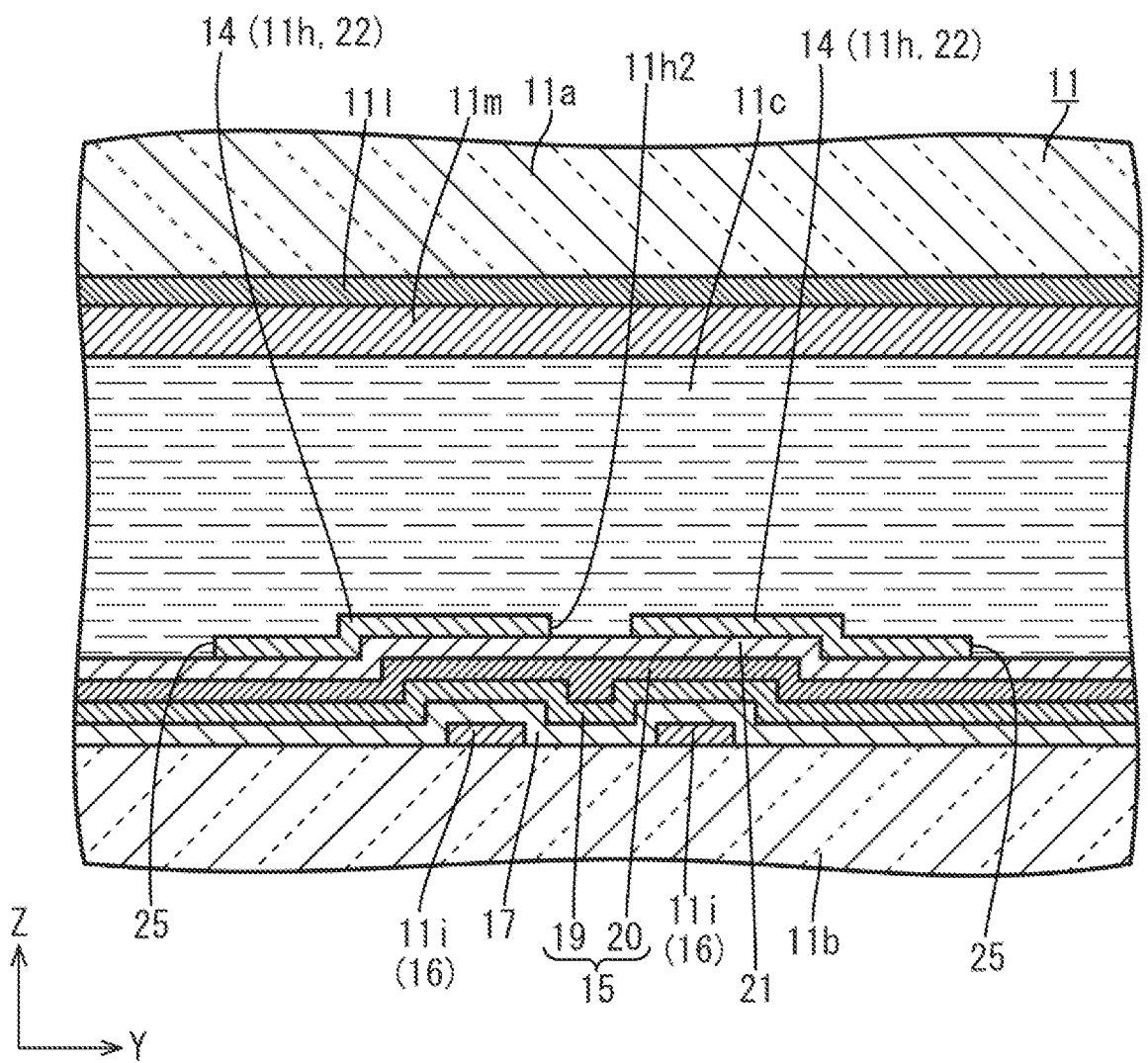
FIG. 6 is a cross-sectional view taken along line D-D in FIG. 2.

In addition, the common electrode 11*h* is arranged such that a part of the partition opening 11*h*2 is positioned between the pair of gate lines 11*i* in the Y-axis direction, as illustrated in FIGS. 2 and 6. That is, a portion of the partition opening 11*h*2 extending along the X-axis direction is arranged by effectively using an interval provided between the pair of gate lines 11*i* in the Y-axis direction so as not to overlap the pixel electrode 11*g* and each gate line 11*i*. Therefore, an aperture ratio can be kept high as compared with a case where the partition opening is arranged so as to overlap the pixel electrode 11*g*, and such an arrangement is suitable for equalizing parasitic capacitances generated between the pair of gate lines 11*i* and the common electrode 11h (touch electrode 14) as compared with a case where the partition opening is arranged so as to overlap one gate line 11i and not to overlap the other gate line 11i. Furthermore, since an electric field generated between the gate lines 11i and the common electrode 11h can be shielded by the common electrode 11h itself, it is difficult for the alignment disorder of the liquid crystal molecules included in the liquid crystal layer 11c to occur.

In addition, the contact hole 23 opened and formed in the inter-transparent electrode film insulating film 21 in order to connect the touch line 15 composed of the first transparent electrode film 19 and the second metal film 20 and the touch electrode 14 composed of the second transparent electrode film 22 to each other is arranged so as to be positioned between the pair of gate lines 11i in the Y-axis direction, as illustrated in FIG. 2. That is, the contact hole 23 is arranged by effectively using the interval provided between the pair of gate lines 11i in the Y-axis direction so as to be spaced apart from the pixel electrode 11g, which is a structure independently exerting the display function. Here, since the contact hole 23 is opened and formed in the inter-transparent electrode film insulating film 21 interposed between the common electrode 11h constituting the touch electrode 14 and the pixel electrode 11g, it is easy for the alignment disorder to occur in the liquid crystal molecules included in the liquid crystal layer 11c in the vicinity of the contact hole 23, such that there is a possibility that a display defect will occur. In that respect, as described above, the contact hole 23 is arranged between the pair of gate lines 11i and is arranged so as to be spaced apart from the pixel electrode 11g contributing to display. Therefore, it is difficult for a display defect caused by the contact hole 23 to occur, and an aperture ratio can thus be kept high. In addition, since the light blocking portion 111 is arranged on a side of the CF substrate 11a so as to overlap the gate lines 11i when viewed in a plane, it is difficult for the alignment disorder that can occur in the liquid crystal molecules included in the liquid crystal layer 11c due to the contact hole 23 to have an influence on the display quality.

In addition, the source lines 11j and the touch lines 15 arranged in the display area AA of the array substrate 11b are connected to source lead lines (signal lead lines) 26 and touch lead lines (position detection lead lines) 27 arranged in the non-display area NAA, respectively, as illustrated in FIG. 1. Note that, in FIG. 1, illustration of the source lines 11j is omitted. The multiple source lead lines 26 and the multiple touch lead lines 27 are arranged side by side so as to be spaced apart from each other along the X-axis direction, similar to the source lines 11j and the touch lines 15, one ends of the source lead lines 26 and the touch lead lines 27 are connected to end portions of the source lines 11j and the touch lines 15, respectively, while the other ends of the source lead lines 26 and the touch lead lines 27 are led in a substantially fan shape toward a mounting area of the driver 12, and terminal portions (not illustrated) connected to the driver 12 are provided at led tip portions of the source lead lines 26 and the touch lead lines 27, respectively. The other ends of the multiple source lead lines 26 are aggregated into a central portion in a long side direction (X-axis direction) of the driver 12, while the other ends of the multiple touch lead lines 27 are divided and aggregated into two groups at both end portions in the long side direction of the driver 12, respectively. The driver 12 is provided with each of circuits for outputting image signals to the source lead lines 26 at the central portion in the long side direction and circuits for outputting touch signals to the touch lead lines 27 at the both end portions in the long side direction. Note that, in FIG. 1, for the purpose of distinction, the source lead lines 26 are illustrated by thick solid lines, and the touch lead lines 27 are illustrated by thin solid lines.

As described above, the liquid crystal display device (display device with a position input function) 10 according to the present embodiment includes the pixel electrodes 11g that are arranged so as to be spaced apart from each other, the touch electrode (position detection electrode) 14 that forms a capacitance with the finger which is the position input body performing the position input to detect an input position by the finger which is the position input body, the touch line (position detection line) 15 that is arranged so as to be sandwiched between the pixel electrodes 11g adjacent to each other and is connected to the touch electrode 14, and at least two source lines (signal lines) 11j that extend in parallel with the touch line 15, transmit image signals supplied to the pixel electrodes 11g, and are arranged such that two pixel electrodes 11g sandwiching the touch line 15 are each sandwiched between the at least two source lines 11j and the touch line 15.

According to this configuration, the pixel electrodes 11g are charged with potentials based on the image signals supplied by the source lines 11j, such that display is performed. On the other hand, the touch electrode 14 can form the capacitance with the finger which is the position input body performing the position input to detect the input position by the finger which is the position input body using a signal supplied by the touch line 15.

Since the at least two source lines 11j are arranged such that the two pixel electrodes 11g sandwiching the touch line 15 are each sandwiched between the at least two source lines 11j and the touch line 15, the at least two source lines 11j are arranged so as not to overlap the touch line 15. Therefore, the situation in which the parasitic capacitance is generated between the touch line 15 and the source line 11j can be suitably avoided, and the sensitivity and the display quality related to the position detection are thus improved. In addition, since the source line 11j is not sandwiched between the two pixel electrodes 11g sandwiching the touch line 15, the number and an arrangement space of the source lines 11j are reduced as compared with a case where the source lines are individually arranged adjacent to the respective pixel electrodes 11g. Thus, a high definition, a narrow frame, a high aperture ratio, and the like, are achieved.

In addition, the liquid crystal display device further includes the first transparent electrode film 19 which is a conductive film constituting at least parts of the touch line 15 and the source line 11j. According to this configuration, it is possible to provide at least parts of the touch line 15 and the source line 11j by patterning the first transparent electrode film 19 which is the common conductive film. As compared with a case where the touch line and the source line are provided, respectively, by patterning different conductive films, photomasks or the like required for the patterning can be reduced, and a producing cost can thus be reduced.

In addition, the liquid crystal display device further includes the first transparent electrode film (transparent electrode film) 19 that constitutes the pixel electrode 11g. At least the first transparent electrode film 19 is included in the conductive film. According to this configuration, it is possible to provide the pixel electrode 11g in addition to the touch line 15 and the source line 11j by patterning the common first transparent electrode film 19 included in the conductive film. Thus, the photomasks or the like required for the patterning can be further reduced, and a producing cost can thus be further reduced.

In addition, the liquid crystal display device further includes the gate line (scan line) 11*i* that extends so as to intersect with the source line 11*j* and the touch line 15 and transmits the scan signal and the TFT (switching component) 11*f* that is connected to the pixel electrode 11*g*, the source line 11*j*, and the gate line 11*i*, is driven on the basis of the scan signal, and charges the pixel electrode 11*g* with the potential based on the image signal. The pair of gate lines 11*i* sandwiched between the pixel electrodes 11*g* adjacent to each other are arranged so as to be spaced apart from and be parallel to each other, while at least two TFTs 11*f* are arranged so as to be connected to each of the pair of gate lines 11*i*, the source line 11*j*, and at least two pixel electrodes 11*g* arranged so as to sandwich the source line 11*j*. According to this configuration, when the input timings of the scan signals for the pair of gate lines 11*i* are made different from each other and the image signals are input to the source line 11*j* in synchronization with the input timings, the at least two TFTs 11*f* are driven at different timings, and the at least two pixel electrodes 11*g* sandwiching the source line 11*j* can be each charged with the potentials based on the image signals input to the source line 11*j* at the different timings.

In addition, the liquid crystal display device further includes the common electrode 11*h* that is arranged so as to at least partially overlap the pixel electrode 11*g* with the inter-transparent electrode film insulating film (insulating film) 21 interposed therebetween, is divided to constitute the touch electrodes 14, and has the partition opening 11*h*2 partitioning between the touch electrodes 14 adjacent to each other. The common electrode 11*h* is arranged such that at least a part of the partition opening 11*h*2 is positioned between the pair of gate lines 11*i*. According to this configuration, since the partition opening 11*h*2 is arranged by effectively using the interval provided between the pair of gate lines 11*i*, the aperture ratio can be kept high as compared with a case where the partition opening is arranged so as to overlap the pixel electrode 11*g*. In addition, such a configuration is suitable for equalizing the parasitic capacitances generated between the pair of gate lines 11*i* and the common electrode 11*h* as compared with a case where the partition opening is arranged so as to overlap one gate line 11*i* and not to overlap the other gate line 11*i*. Furthermore, since an electric field generated between the gate lines 11*i* and the common electrode 11*h* can be shielded by the common electrode 11*h* itself, in a case of controlling the alignment of the liquid crystal molecules by an electric field generated between the pixel electrode 11*g* and the common electrode 11*h*, it is difficult for the alignment disorder of the liquid crystal molecules to occur.

In addition, the liquid crystal display device further includes the common electrode 11*h* that is arranged so as to at least partially overlap the pixel electrode 11*g* with the inter-transparent electrode film insulating film 21 interposed therebetween and is divided to constitute the touch electrodes 14. The touch line 15 is connected to the touch electrode 14 through the contact hole 23 positioned between the pair of gate lines 11*i* in the inter-transparent electrode film insulating film 21 and opened and formed. Since the contact hole 23 connecting any one of the touch electrodes 14 formed by dividing the common electrode 11*h* and the touch line 15 to each other is opened and formed in the inter-transparent electrode film insulating film 21 interposed between the common electrode 11*h* and the pixel electrode 11*g*, in the case of controlling the alignment of the liquid crystal molecules by the electric field generated between the pixel electrode 11*g* and the common electrode 11*h*, it is easy for the alignment disorder of the liquid crystal molecules to occur in the vicinity of the contact hole 23, such that there is a possibility that a display defect will occur. In that respect, as described above, the contact hole 23 is arranged between the pair of gate lines 11*i* and is arranged so as to be spaced apart from the pixel electrode 11*g* contributing to display. Therefore, it is difficult for a display defect caused by the contact hole 23 to occur, and an aperture ratio can thus be kept high.

In addition, the touch electrode 14 has the source line overlapping opening (signal line overlapping opening) 24 arranged so as to overlap at least a part of the source line 11*j*. According to this configuration, since the touch electrode 14 has the source line overlapping opening 24 arranged so as to overlap at least a part of the source line 11*j*, the parasitic capacitance that can be generated between the source line 11*j* and the touch electrode 14 is reduced. Thus, the sensitivity and the display quality related to the position detection are further improved.

In addition, the touch electrode 14 has the touch line overlapping opening (position detection line overlapping opening) 25 arranged so as to overlap at least a part of the touch line 15. According to this configuration, since the touch electrode 14 has the touch line overlapping opening 25 arranged so as to overlap at least a part of the touch line 15, the parasitic capacitance that can be generated between the touch line 15 and the touch electrode 14 is reduced. Thus, the sensitivity related to the position detection is improved.

In addition, the liquid crystal display device further includes the common electrode 11*h* that is arranged so as to at least partially overlap the pixel electrode 11*g* with the inter-transparent electrode film insulating film 21 interposed therebetween, is divided to constitute the touch electrodes 14, and has the partition opening 11*h*2 partitioning between the touch electrodes 14 adjacent to each other. The common electrode 11*h* is arranged such that the partition opening 11*h*2 overlaps at least some of at least either one of the source lines 11*j* and the touch lines 15. According to this configuration, the partition opening 11*h*2 partitioning between the touch electrodes 14 adjacent to each other is arranged so as to overlap at least some of at least either one of the source lines 11*j* and the touch lines 15, such that it is possible to reduce the parasitic capacitance that can be generated between the source line 11*j* and the touch electrode 14 or the parasitic capacitance that can be generated between the touch line 15 and the touch electrode 14. As such, it is possible to achieve the reduction in the parasitic capacitance using the partition opening 11*h*2, which is an existing structure. An aperture ratio can be kept high as compared with a case where the partition opening is arranged so as not to overlap the source line 11*j* or the touch line 15 and so as to overlap the pixel electrode 11*g*.

In addition, the common electrode 11*h* is arranged such that the partition opening 11*h*2 selectively overlaps at least some of the touch lines 15. In a case where the partition opening is arranged so as to overlap at least some of the source lines 11*j*, the partition opening does not overlap all of the at least two source lines 11*j*. Therefore, the source lines that do not overlap the partition opening among the at least two source lines 11*j* are generated. As a result, there is a possibility that loads of each source line 11*j* will become non-uniform. In that respect, as described above, the partition opening 11*h*2 is arranged so as to selectively overlap at least some of the touch lines 15, and loads of the at least two source lines 11*j* can thus be kept uniform. Thus, it is possible to suppress a display defect such as luminance unevenness or the like and it is possible to reduce the parasitic capacitance that can be generated between the touch line 15 and the touch electrode 14.

Second Embodiment

A second embodiment of the present invention will be described with reference to FIGS. 7 to 10. In the second embodiment, it is illustrated that an interlayer insulating film 28 is added. Note that an overlapping description for a structure, an action, and an effect similar to those of the first embodiment described above is omitted.

Figure 8:
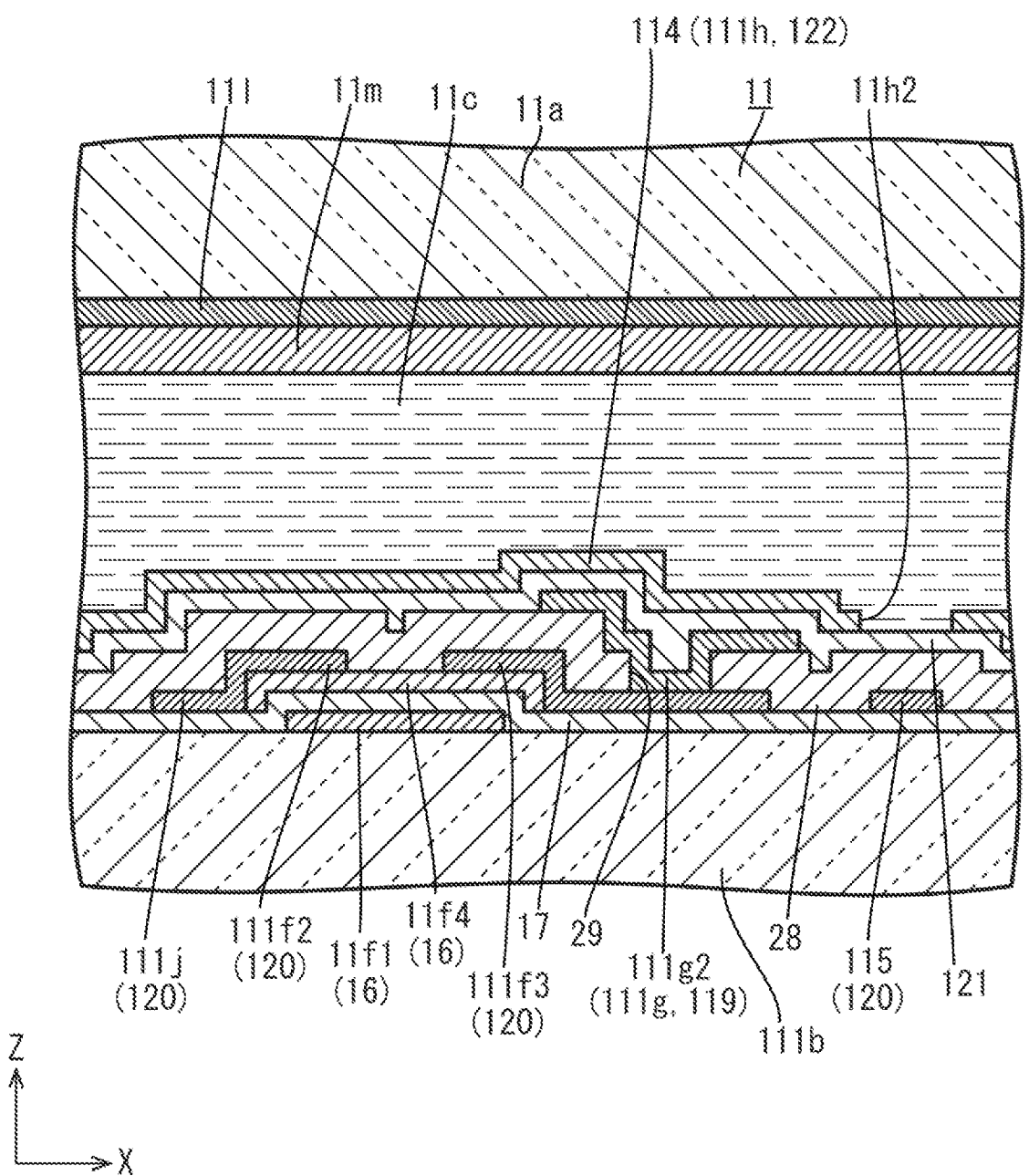
FIG. 8 is a cross-sectional view taken along line A-A in FIG. 7.
Figure 9:
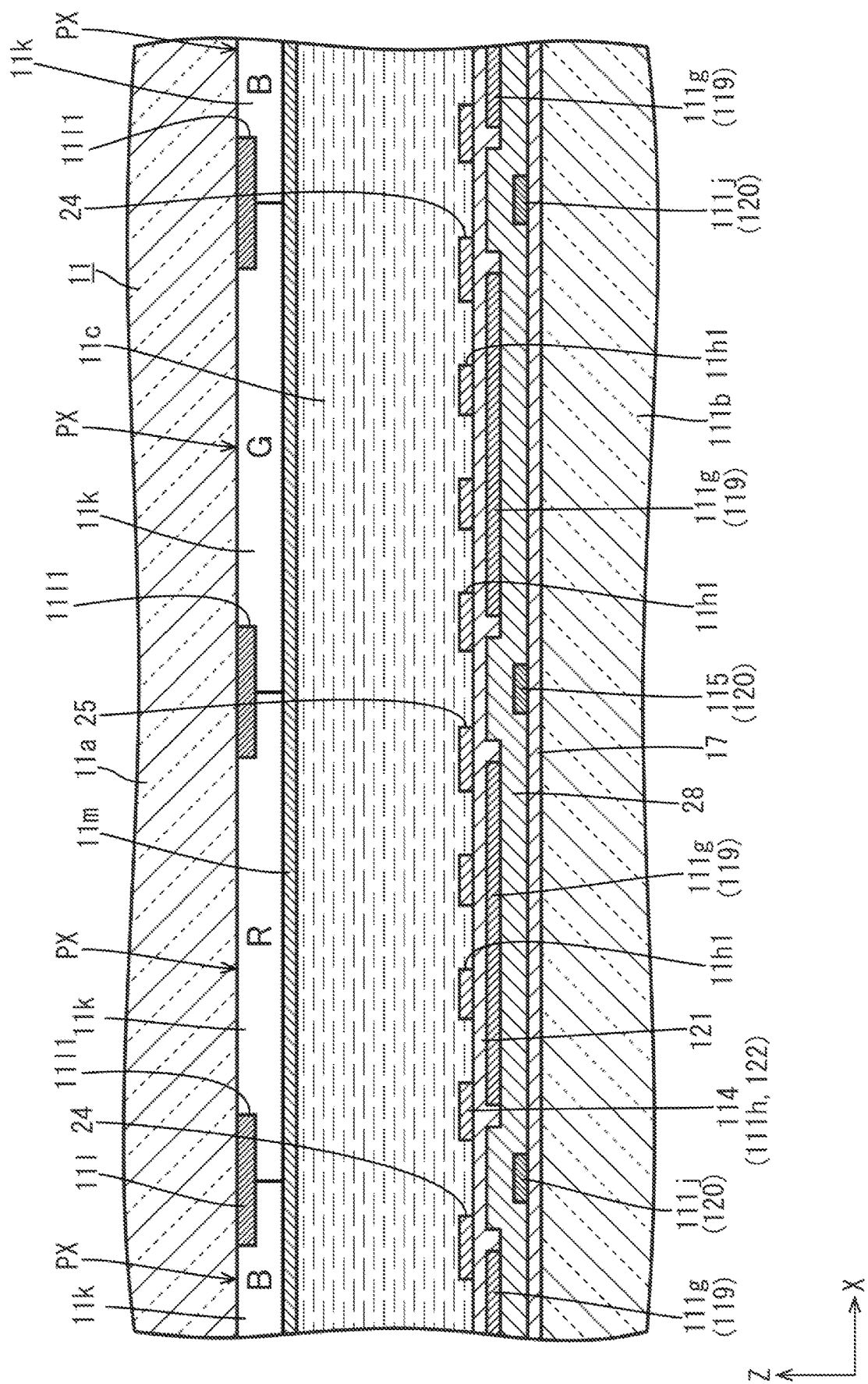
FIG. 9 is a cross-sectional view taken along line B-B in FIG. 7.
Figure 10:
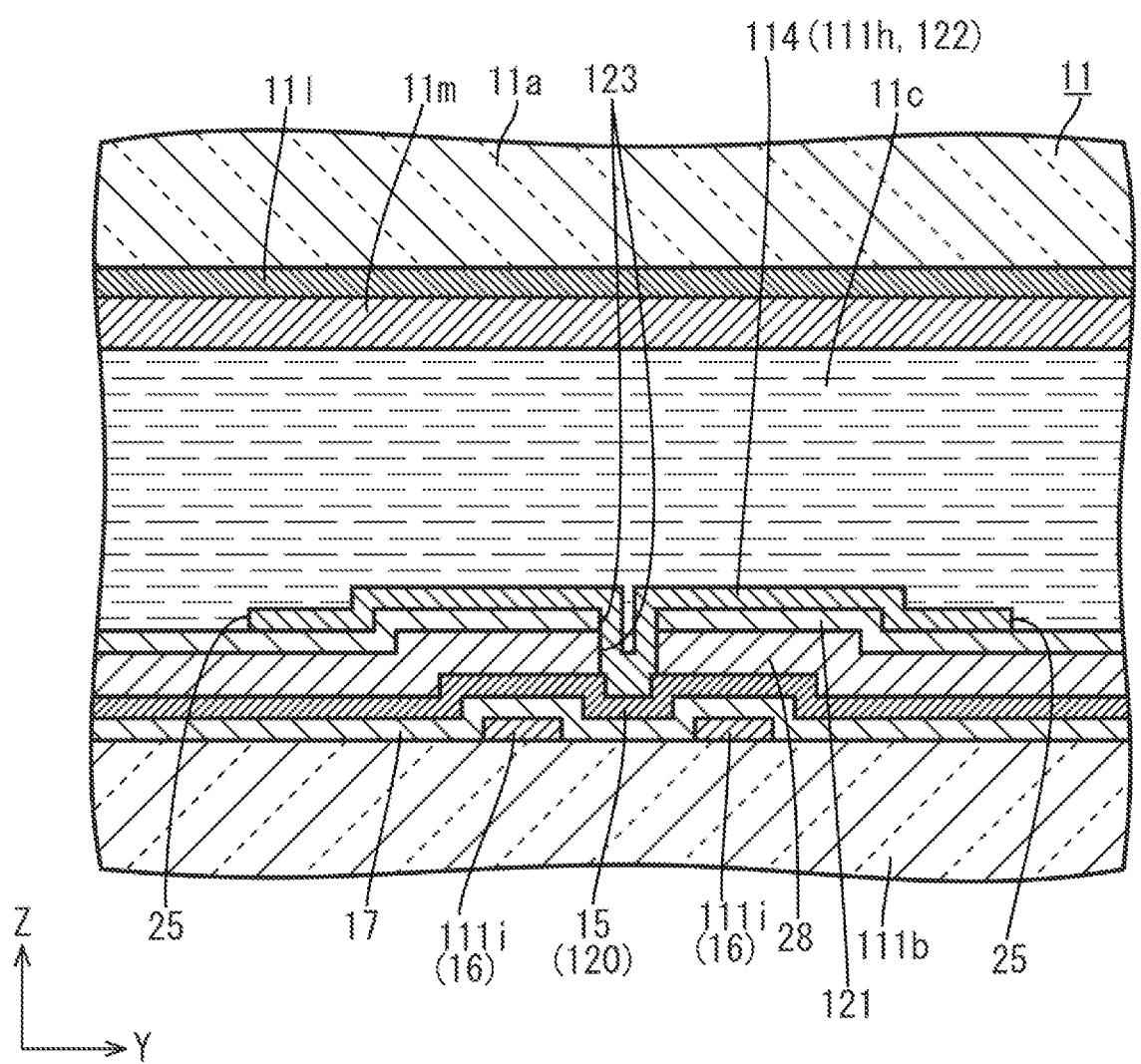
FIG. 10 is a cross-sectional view taken along line C-C in FIG. 7.

An array substrate 111*b* according to the present embodiment is provided with an interlayer insulating film 28 interposed between a first transparent electrode film 119 and a second metal film 120, as illustrated in FIGS. 8 and 9. The interlayer insulating film 28 is formed of an inorganic material, similar to an inter-transparent electrode film insulating film 121, and maintains the first transparent electrode film 119 and the second metal film 120 in an insulating state. The first transparent electrode film 119 is arranged on an upper layer side with respect to the interlayer insulating film 28, while the second metal film 120 is arranged on a lower layer side with respect to the interlayer insulating film 28. Accordingly, in the present embodiment, a source line 111*j* and a touch line 115 are composed of only the second metal film 120. Therefore, the interlayer insulating film 28 is interposed between the source line 111*j* and the touch line 115 composed of the second metal film 120 and a pixel electrode 111*g* composed of the first transparent electrode film 119. Furthermore, the interlayer insulating film 28 and the inter-transparent electrode film insulating film 121 are interposed between the source line 111*j* and the touch line 115 composed of the second metal film 120 and a touch electrode 114 (common electrode 111*h*) composed of a second transparent electrode film 122. Thus, in comparison with the first embodiment described above, a distance between the source line 111*j* and the touch line 115, and the touch electrode 114 is increased by a thickness of the interlayer insulating film 28, and a parasitic capacitance that can be generated between the source line 111*j* and the touch line 115, and the touch electrode 114 is thus reduced. Therefore, sensitivity and display quality related to position detection are further improved. In addition, a contact hole 123 for connecting the touch electrode 114 and the touch line 115 to each other is opened and formed so as to communicate with the inter-transparent electrode film insulating film 121 and the interlayer insulating film 28, as illustrated in FIG. 10.

Figure 7:
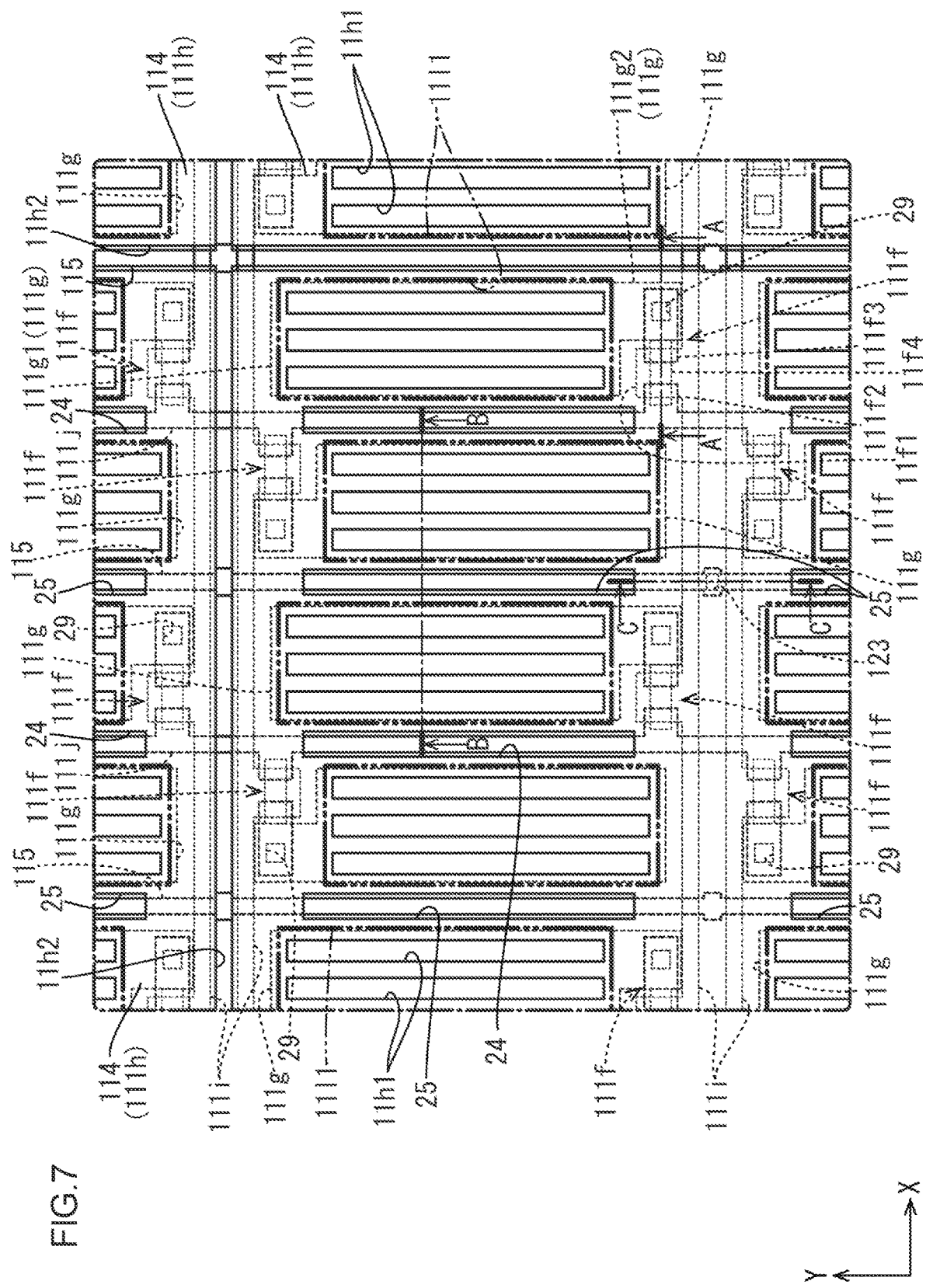
FIG. 7 is a plan view illustrating a pixel arrangement of an array substrate constituting a liquid crystal panel according to a second embodiment of the present invention.

In the present embodiment, the inter-transparent electrode film insulating film 121 has a thickness smaller than that of the interlayer insulating film 28, as illustrated in FIGS. 8 and 9. According to such a configuration, since an interval between the pixel electrode 111*g* and the common electrode 111*h* is reduced, an electric field generated between both the electrodes 111*g* and 111*h* (particularly, an electric field in a horizontal direction with respect to a substrate in a liquid crystal display device in a horizontal electric field mode) becomes stronger, and thus, display quality is further improved. On the other hand, the interlayer insulating film 28 has a thickness larger than that of the inter-transparent electrode film insulating film 121, such that an interval between the source line 111*j* and the touch line 115, and the touch electrode 114 is increased. Thus, the parasitic capacitance that can be generated between the source line 111*j* and the touch line 115, and the touch electrode 114 is further reduced. Therefore, the sensitivity and the display quality related to the position detection are further improved. In addition, a source electrode 111*f*2 and a drain electrode 111*f*3 constituting a TFT 111*f* are composed of only the second metal film 120, similar to the source line 111*j* and the touch line 115. Therefore, the drain electrode 111*f*3 is connected to a contact portion 111*g*2 of the pixel electrode 111*g* composed of the first transparent electrode film 119 through a pixel contact hole 29 formed in the interlayer insulating film 28, as illustrated in FIGS. 7 and 8. The pixel contact hole 29 is arranged in a plane at a position where the drain electrode 111*f*3 of each TFT 111*f* and the contact portion 111*g*2 of each pixel electrode 111*g* overlap each other.

As described above, according to the present embodiment, the liquid crystal display device includes the first transparent electrode film 119 that constitutes one of the pixel electrode 111*g* and the touch electrode 114, the second transparent electrode film 122 that constitutes the other of the pixel electrode 111*g* and the touch electrode 114 and has the inter-transparent electrode film insulating film 121 interposed between the first transparent electrode film 119 and the second transparent electrode film 122, and the second metal film (metal film) 120 that is arranged on a side opposite to a side of the second transparent electrode film 122 with respect to the first transparent electrode film 119 and has the interlayer insulating film 28 interposed between the first transparent electrode film 119 and the second metal film 120. At least the second metal film 120 is included in a conductive film. According to this configuration, as compared with a case where the conductive film includes the first transparent electrode film 119, a distance between the touch line 115 and the source line 111*j*, and the touch electrode 114 is increased by the thickness of the interlayer insulating film 28. Thus, the parasitic capacitance that can be generated between the touch line 115 and the source line 111*j*, and the touch electrode 114 is reduced, and the sensitivity and thus, the display quality related to the position detection are further improved. In addition, since a distance between a gate line 111*i* and the touch electrode 115 is also increased by the thickness of the interlayer insulating film 28, the parasitic capacitance that can be generated between the gate line 111*i* and the touch electrode 115 is reduced.

In addition, the liquid crystal display device further includes the common electrode 111*h* that is arranged so as to at least partially overlap the pixel electrode 111*g* with the inter-transparent electrode film insulating film 121 interposed therebetween and is divided to constitute the touch electrodes 114. The inter-transparent electrode film insulating film 121 has the thickness smaller than that of the interlayer insulating film 28. According to such a configuration, since the interval between the pixel electrode 111*g* and the common electrode 111*h* is reduced, the electric field generated between both the electrodes 111*g* and 111*h* becomes stronger, and thus, the display quality is further improved. On the other hand, the interlayer insulating film 28 has the thickness larger than that of the inter-transparent electrode film insulating film 121, such that the interval between the touch line 115 and the source line 111*j*, and the touch electrode 114 is increased. Thus, the parasitic capacitance that can be generated between the touch line 115 and the source line 111*j*, and the touch electrode 114 is further reduced. Therefore, the sensitivity and the display quality related to the position detection are further improved.

Third Embodiment

A third embodiment of the present invention will be described with reference to FIG. 11 or FIG. 12. In the third embodiment, it is illustrated that an arrangement of a touch line 215 is changed from the second embodiment described above and a third metal film 30 is added. Note that an overlapping description for a structure, an action, and an effect similar to those of the second embodiment described above is omitted.

Figure 11:
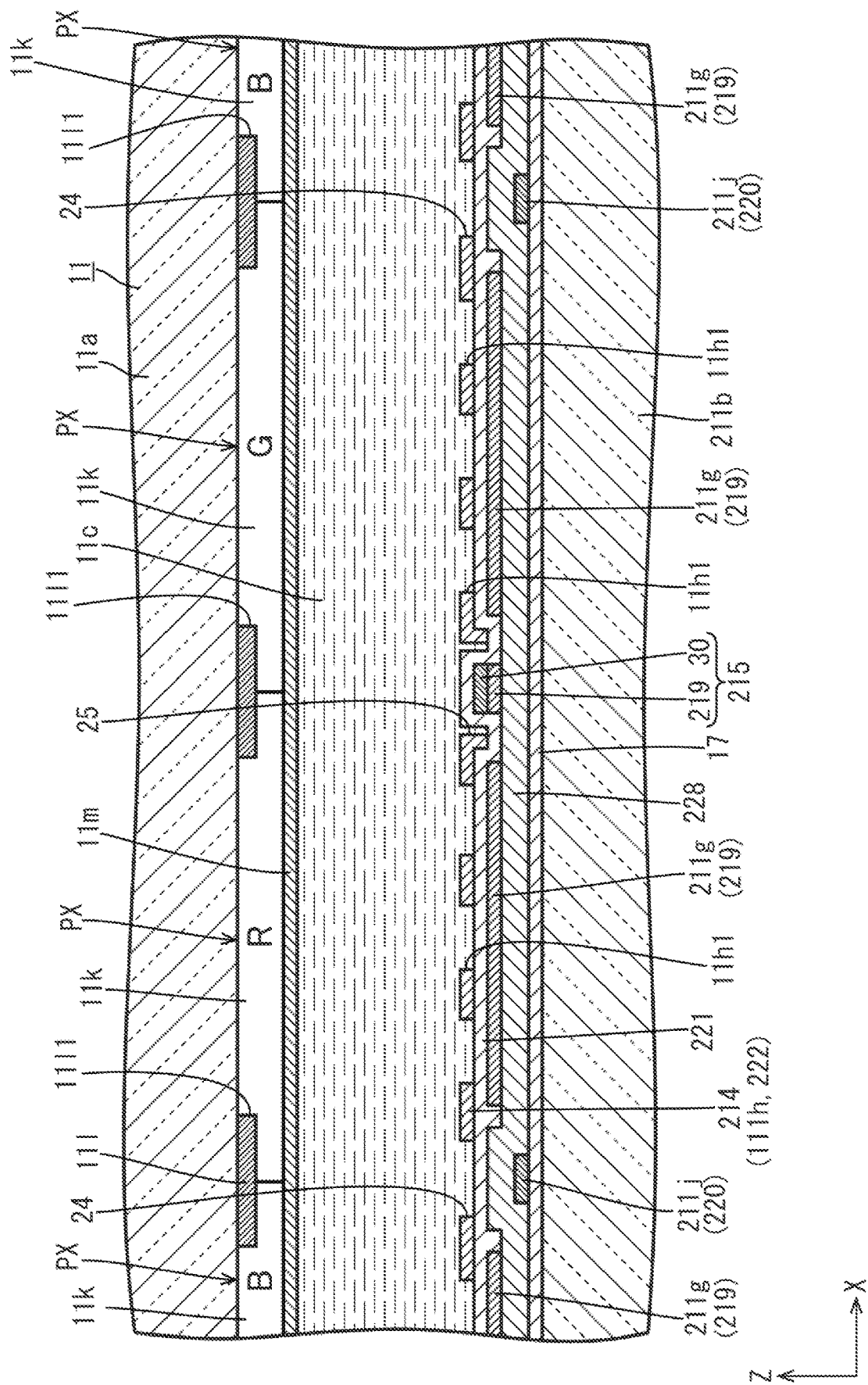
FIG. 11 is a cross-sectional view taken along the vicinity of the center of a pixel portion in a liquid crystal panel according to a third embodiment of the present invention.
Figure 12:
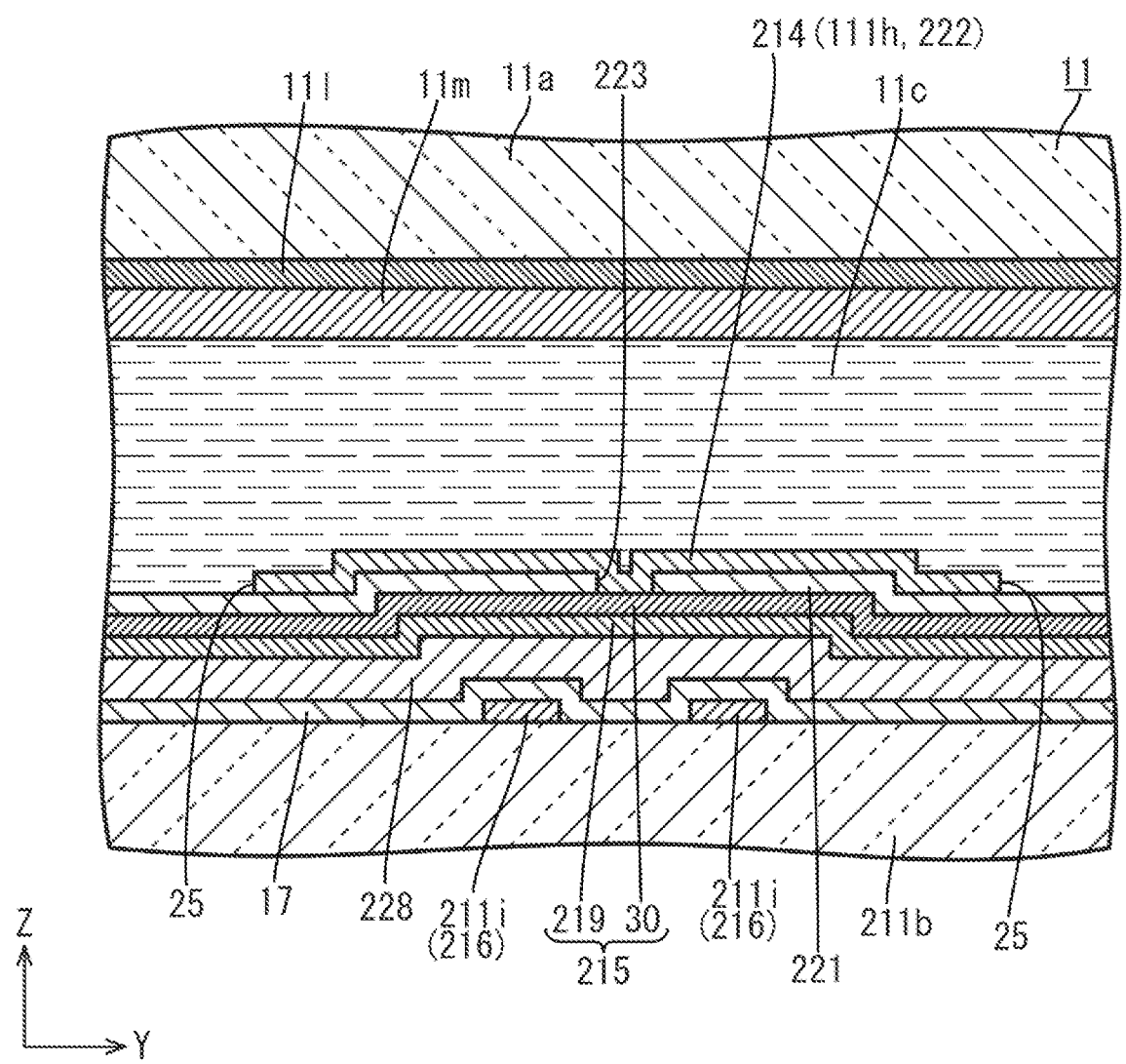
FIG. 12 is a cross-sectional view of a connection place between a touch electrode and a touch line.

An array substrate 211b according to the present embodiment is provided with a third metal film 30 interposed between a first transparent electrode film 219 and an inter-transparent electrode film insulating film 221, as illustrated in FIG. 11. The third metal film 30 is a single layer film formed of one type of metal material or a laminate film or an alloy formed of different types of metal materials to have conductivity and a light blocking property, similar to a first metal film 216 and a second metal film 220. The touch line 215 has a laminated structure of the first transparent electrode film 219 and the third metal film 30. That is, the touch line 215 is arranged on an upper layer side of an interlayer insulating film 228 and is arranged on the same layer as that of a pixel electrode 211g composed of the first transparent electrode film 219, but is arranged on an upper layer side of a source line 211j composed of the second metal film 220 with the interlayer insulating film 228 interposed therebetween. Therefore, as compared with a case where the source line 11j and the touch line 15 are arranged on the same layer as in the first embodiment described above, an interval between the source line 211j and a touch electrode 214 is increased by a thickness of the interlayer insulating film 228. Thus, a parasitic capacitance that can be generated between the source line 211j and the touch electrode 214 is reduced, and thus, sensitivity and display quality related to position detection are further improved. In addition, a contact hole 223 for connecting the touch electrode 214 and the touch line 215 to each other is opened and formed only in the inter-transparent electrode film insulating film 221, as illustrated in FIG. 12.

As described above, according to the present embodiment, the liquid crystal display device includes the first transparent electrode film 219 that constitutes one of the pixel electrode 211g and the touch electrode 214, a second transparent electrode film 222 that constitutes the other of the pixel electrode 211g and the touch electrode 214 and has the inter-transparent electrode film insulating film 221 interposed between the first transparent electrode film 219 and the second transparent electrode film 222, and the second metal film 220 that is arranged on a side opposite to a side of the second transparent electrode film 222 with respect to the first transparent electrode film 219 and has the interlayer insulating film 228 interposed between the first transparent electrode film 219 and the second metal film 220. The first transparent electrode film 219 constitutes at least a part of the touch line 215, while the second metal film 220 constitutes at least a part of the source line 211j. According to this configuration, as compared with a case where the first transparent electrode film 219 constitutes at least a part of the source line in addition to the touch line 215, the interval between the source line 211j and the touch electrode 214 is increased by the thickness of the interlayer insulating film 228. Thus, a parasitic capacitance that can be generated between the source line 211j and the touch electrode 214 is reduced, and thus, sensitivity and display quality related to position detection are further improved. In addition, since a distance between a gate line 211i and the touch electrode 215 is also increased by the thickness of the interlayer insulating film 228, the parasitic capacitance that can be generated between the gate line 211i and the touch electrode 215 is reduced.

Fourth Embodiment

A fourth embodiment of the present invention will be described with reference to FIG. 13 or FIG. 14. In the fourth embodiment, it is illustrated that a configuration of a touch line 315 is changed from the third embodiment described above. Note that an overlapping description for a structure, an action, and an effect similar to those of the third embodiment described above is omitted.

Figure 13:
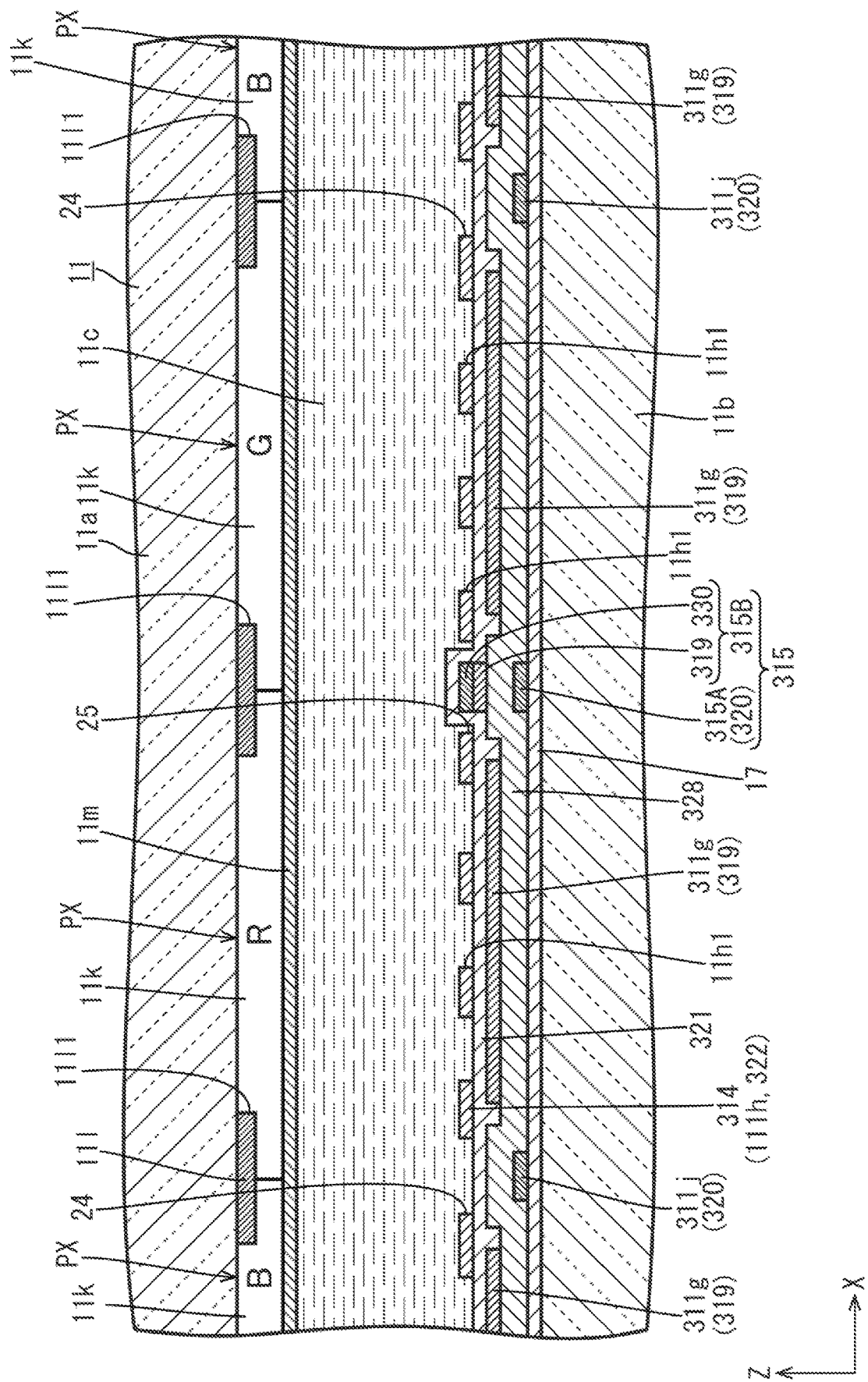
FIG. 13 is a cross-sectional view taken along the vicinity of the center of a pixel portion in a liquid crystal panel according to a fourth embodiment of the present invention.
Figure 14:
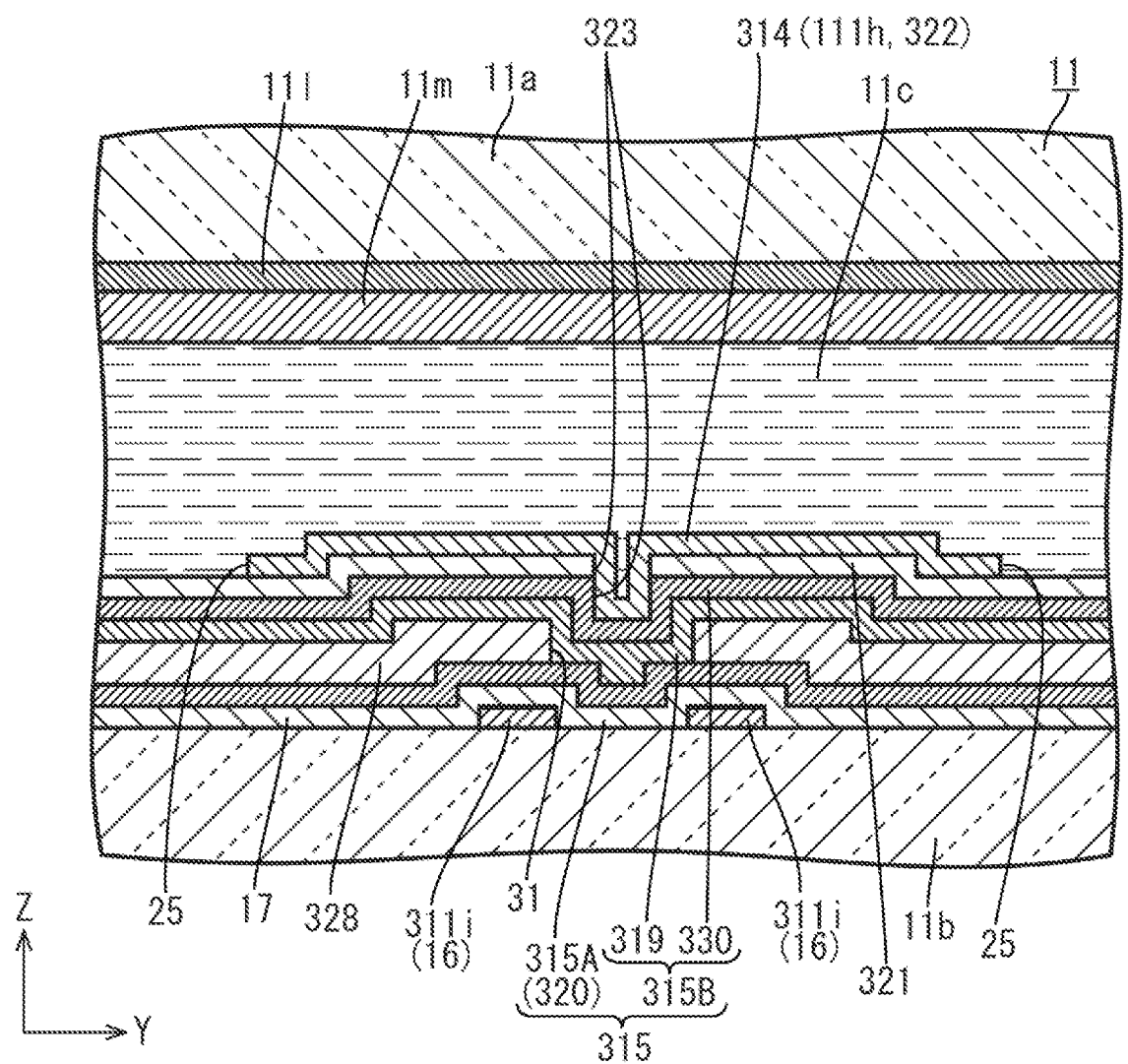
FIG. 14 is a cross-sectional view of a connection place between a touch electrode and a touch line.

The touch line 315 according to the present embodiment includes a first touch line 315A composed of a second metal film 320 and a second touch line 315B having a laminated structure of a first transparent electrode film 319 and a third metal film 330, as illustrated in FIGS. 13 and 14. Both of the first touch line 315A and the second touch line 315B extend along a Y-axis direction, overlap each other, and have line widths that are substantially the same as each other. A touch line contact hole (contact hole) 31 is opened and formed at a position where the first touch line 315A and the second touch line 315B overlap each other, in an interlayer insulating film 328 interposed between the second metal film 320 constituting the first touch line 315A and the first transparent electrode film 319 constituting a part of the second touch line 315B. The first touch line 315A arranged on a lower layer side with respect to the interlayer insulating film 328 and the second touch line 315B arranged on an upper layer side with respect to the interlayer insulating film 328 are electrically connected to each other through the touch line contact hole 31. The touch line contact holes 31 are arranged in the interlayer insulating film 328 at positions between a pair of gate lines 311i in the Y-axis direction, that is, positions that do not overlap pixel electrodes 311g. Therefore, the touch line contact holes 31 include a touch line contact hole 31 arranged so as to overlap a contact hole 323 for connecting a touch electrode 314 and the touch line 315 to each other. According to such a configuration, even in a case where a disconnection or the like occurs in any one of the first touch line 315A and the second touch line 315B, if a disconnection or the like does not occur in the other of the first touch line 315A and the second touch line 315B, an electrical function of the touch line 315 can be exerted, which is suitable for ensuring redundancy. In addition, since the first touch line 315A composed of the second metal film 320 and the second touch line 315B including the first transparent electrode film 319 overlap each other and are connected to each other through the touch line contact hole 31 opened and formed in the interlayer insulating film 328, a line resistance of the touch line 315 can be suitably reduced, and sensitivity related to position detection can thus be further improved. In addition, as compared with a case where the source line 11j and the touch line 15 are arranged on the same layer as in the first embodiment described above, a distance between a source line 311j and the touch electrode 314 is increased by a thickness of the interlayer insulating film 328. Thus, a parasitic capacitance that can be generated between the source line 311j and the touch electrode 314 is reduced, and thus, sensitivity and display quality related to position detection are further improved.

As described above, according to the present embodiment, the liquid crystal display device includes the first transparent electrode film 319 that constitutes one of the pixel electrode 311g and the touch electrode 314, a second transparent electrode film 322 that constitutes the other of the pixel electrode 311g and the touch electrode 314 and has an inter-transparent electrode film insulating film 321 interposed between the first transparent electrode film 319 and the second transparent electrode film 322, and the second metal film 320 that is arranged on a side opposite to a side of the second transparent electrode film 322 with respect to the first transparent electrode film 31 and has the interlayer insulating film 328 interposed between the first transparent electrode film 319 and the second metal film 320. The second metal film 320 constitutes at least a part of the source line 311j and the first touch line (first position detection line) 315A which is a part of the touch line 315, while the first transparent electrode film 319 constitutes the second touch line (second position detection line) 315B arranged so as to overlap the first touch line 315A which is a part of the touch line 315 and connected to the first touch line 315A through the touch line contact hole (contact hole) 31 opened and formed in the interlayer insulating film 328. According to this configuration, even in a case where the disconnection or the like occurs in any one of the first touch line 315A and the second touch line 315B, if the disconnection or the like does not occur in the other of the first touch line 315A and the second touch line 315B, the electrical function of the touch line 315 can be exerted, which is suitable for ensuring the redundancy. In addition, since the first touch line 315A composed of the second metal film 320 and the second touch line 315B composed of the first transparent electrode film 319 overlap each other and are connected to each other through the touch line contact hole 31 opened and formed in the interlayer insulating film 328, the line resistance of the touch line 315 can be reduced, and the sensitivity related to position detection can thus be improved. In addition, since the second metal film 320 constitutes at least a part of the source line 311j, as compared with a case where the first transparent electrode film 319 constitutes at least a part of the source line 311j, the distance between the source line 311j and the touch electrode 314 is increased by the thickness of the interlayer insulating film 328. Thus, a parasitic capacitance that can be generated between the source line 311j and the touch electrode 314 is reduced, and thus, sensitivity and display quality related to position detection are further improved.

Fifth Embodiment

A fifth embodiment of the present invention will be described with reference to FIG. 15. In the fifth embodiment, it is illustrated that an arrangement of respective lead lines 426 and 427 is changed from the first embodiment described above. Note that an overlapping description for a structure, an action, and an effect similar to those of the first embodiment described above is omitted.

Figure 15:
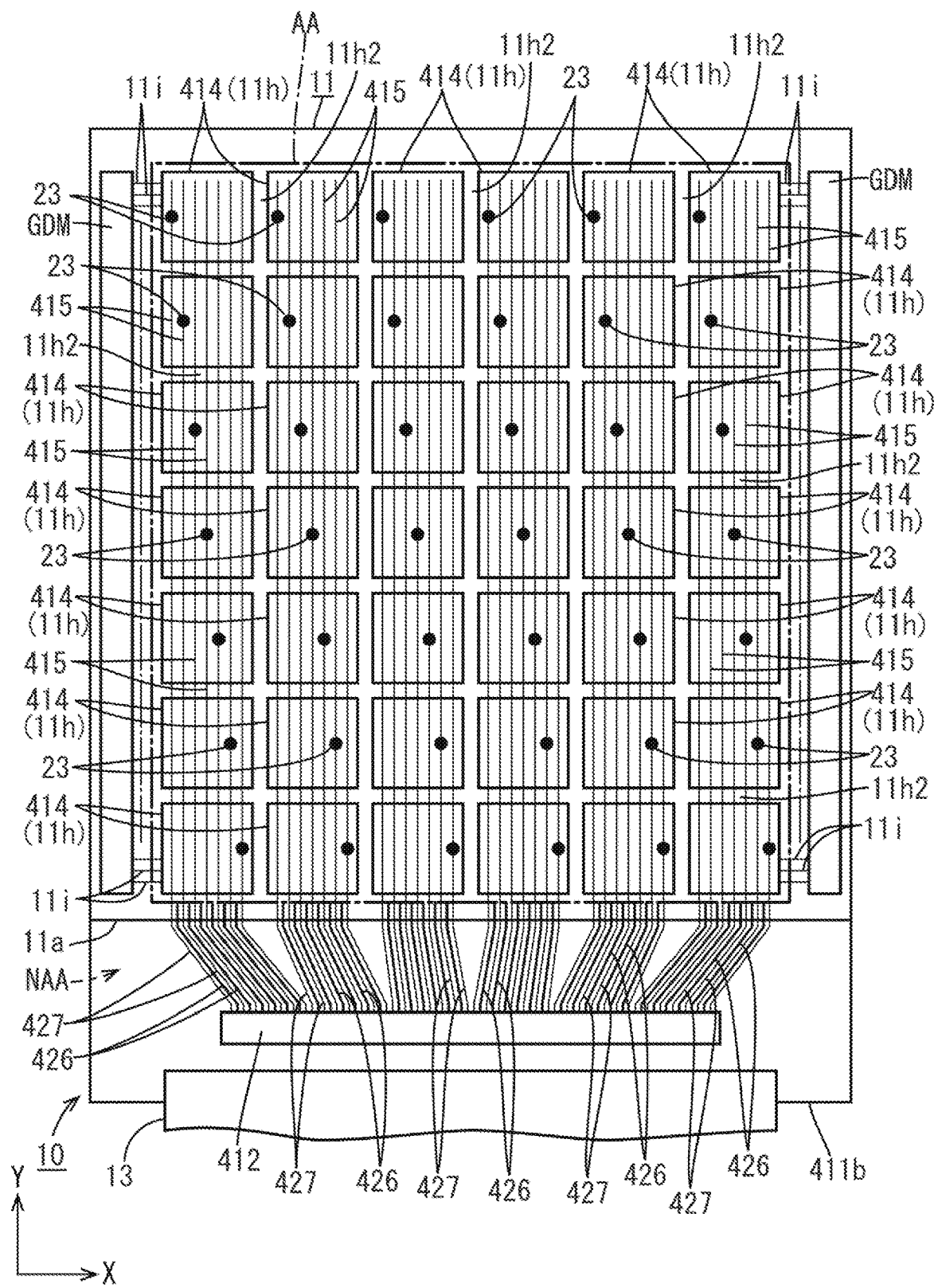
FIG. 15 is a plan view illustrating a plane arrangement of touch electrodes, touch lines, source lines, and the like, of a liquid crystal panel provided in a liquid crystal display device according to a fifth embodiment of the present invention.

Source lead lines 426 and touch lead lines 427 according to the present embodiment are led in parallel with each other in a non-display area NAA of an array substrate 411b, as illustrated in FIG. 15. In detail, the multiple source lead lines 426 and the multiple touch lead lines 427 are led in a substantially fan shape from a display area AA in which source lines (not illustrated) and touch line 415, which are targets to be connected, and extend in parallel with each other until they arrive at a driver 412, such that they are prevented from intersecting with each other in the middle. Thus, it is difficult for a parasitic capacitance to be generated between the source lead lines 426 and the touch lead lines 427, and thus sensitivity and display quality related to position detection are further improved. In addition, in the driver 412, circuits for outputting an image signals to the source lead lines 426 and circuits for outputting touch signals to the touch lead lines 427 are distributed and arranged over substantially the entire length.

As described above, according to the present embodiment, the liquid crystal display device includes the display area AA in which at least pixel electrodes, touch electrodes 414, the touch lines 415, and the source lines are arranged to display an image, the non-display area NAA that surrounds the display area AA, the driver (driving circuit portion) 412 that is mounted in the non-display area NAA, the source lead lines (signal lead lines) 426 that are disposed in the non-display area NAA and have one ends connected to the source lines and the other ends connected to the driver 412, and the touch lead lines (position detection lead lines) 427 that are arranged in the non-display area NAA and have one ends connected to the touch lines 415 and the other ends connected to the driver 412. The source lead lines 426 and the touch lead lines 427 extend in parallel with each other. According to this configuration, the respective signals output from the driver 412 are transmitted to the source lines through the source lead lines 426 and to the touch lines 415 through the touch lead lines 427. Since the source lead lines 426 and the touch lead lines 427 extend in parallel with each other and are prevented from intersecting with each other in the middle, it is difficult for a parasitic capacitance to be generated between the source lead line 426 and the touch lead line 427. Therefore, sensitivity and display quality related to position detection are improved.

Other Embodiments

The present invention is not limited to the embodiments described with reference to the above description and drawings, and, for example, the following embodiments are also included in the technical scope of the present invention.

Figure 16:
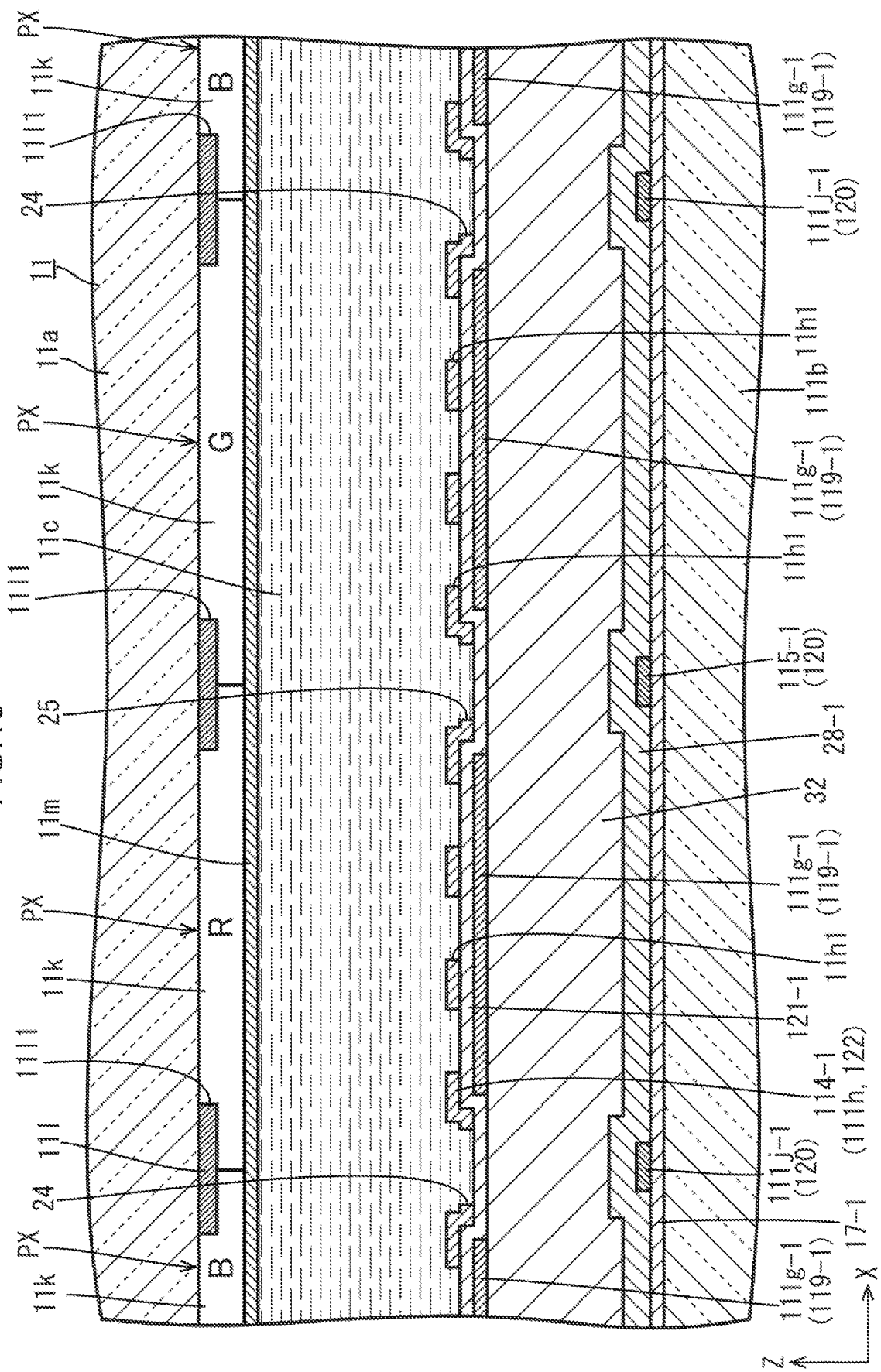
FIG. 16 is a cross-sectional view taken along the vicinity of the center of a pixel portion in a liquid crystal panel according to another embodiment (1) of the present invention.

(1) As a first modification of the second embodiment described above, as illustrated in FIG. 16, a planarizing film 32 may be added between an interlayer insulating film 28-1 and a first transparent electrode film 119-1. The planarizing film 32 according to the first modification is formed of an organic material (for example, an acrylic resin material), and has a thickness larger than that of any of a gate insulating film 17-1, the interlayer insulating film 28-1, and an inter-transparent electrode film insulating film 121-1 formed of an inorganic material. According to such a configuration, since a larger interval is provided between a source line 111j-1 and a touch line 115-1, and a pixel electrode 111g-1 or a touch electrode 114-1, sensitivity and display quality related to position detection are further improved.

Figure 17:
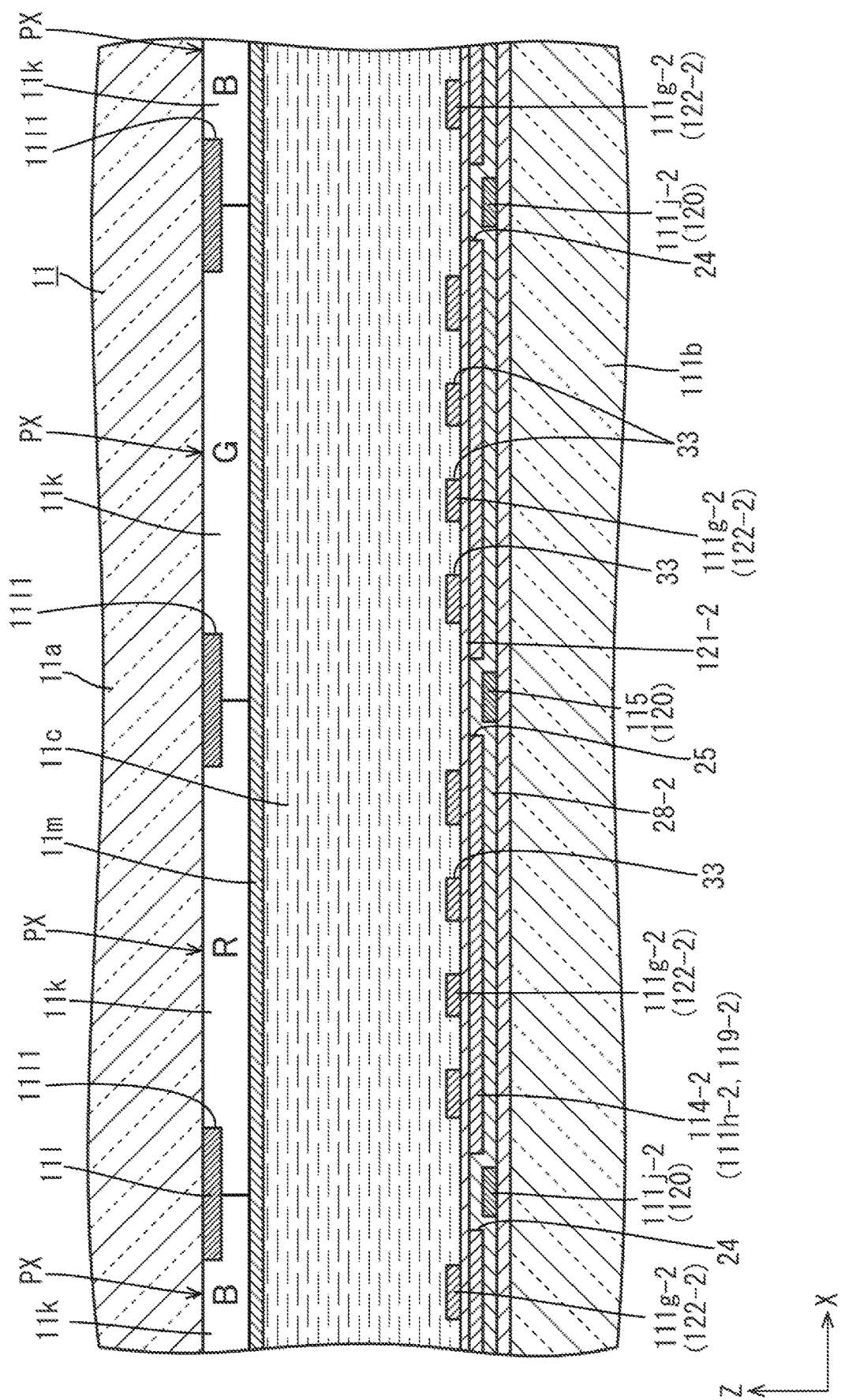
FIG. 17 is a cross-sectional view taken along the vicinity of the center of a pixel portion in a liquid crystal panel according to another embodiment (2) of the present invention.

(2) As a second modification of the second embodiment described above, as illustrated in FIG. 17, arrangements of a common electrode 111h-2 and a touch electrode 114-2, and a pixel electrode 111g-2 can be switched with each other. The common electrode 111h-2 and the touch electrode 114-2 according to the second modification are composed of a first transparent electrode film 119-2, while the pixel electrode 111g-2 is formed of a second transparent electrode film 122-2. According to such a configuration, since an interlayer insulating film 28-2 and an inter-transparent electrode film insulating film 121-2 are interposed between a source line 111j-2 and the pixel electrode 111g-2, an interval between the source line 111j-2 and the pixel electrode 111g-2 is increased by a thickness of the inter-transparent electrode film insulating film 121-2, and thus, display quality is further improved. Note that the pixel electrodes 111g-2 are provided with common electrode overlapping openings 33 arranged so as to overlap the common electrode 111h-2. The common electrode overlapping opening 33 has the same structure and function as those of the pixel overlapping opening 11h1 described in the first embodiment (see FIG. 4).

Figure 18:
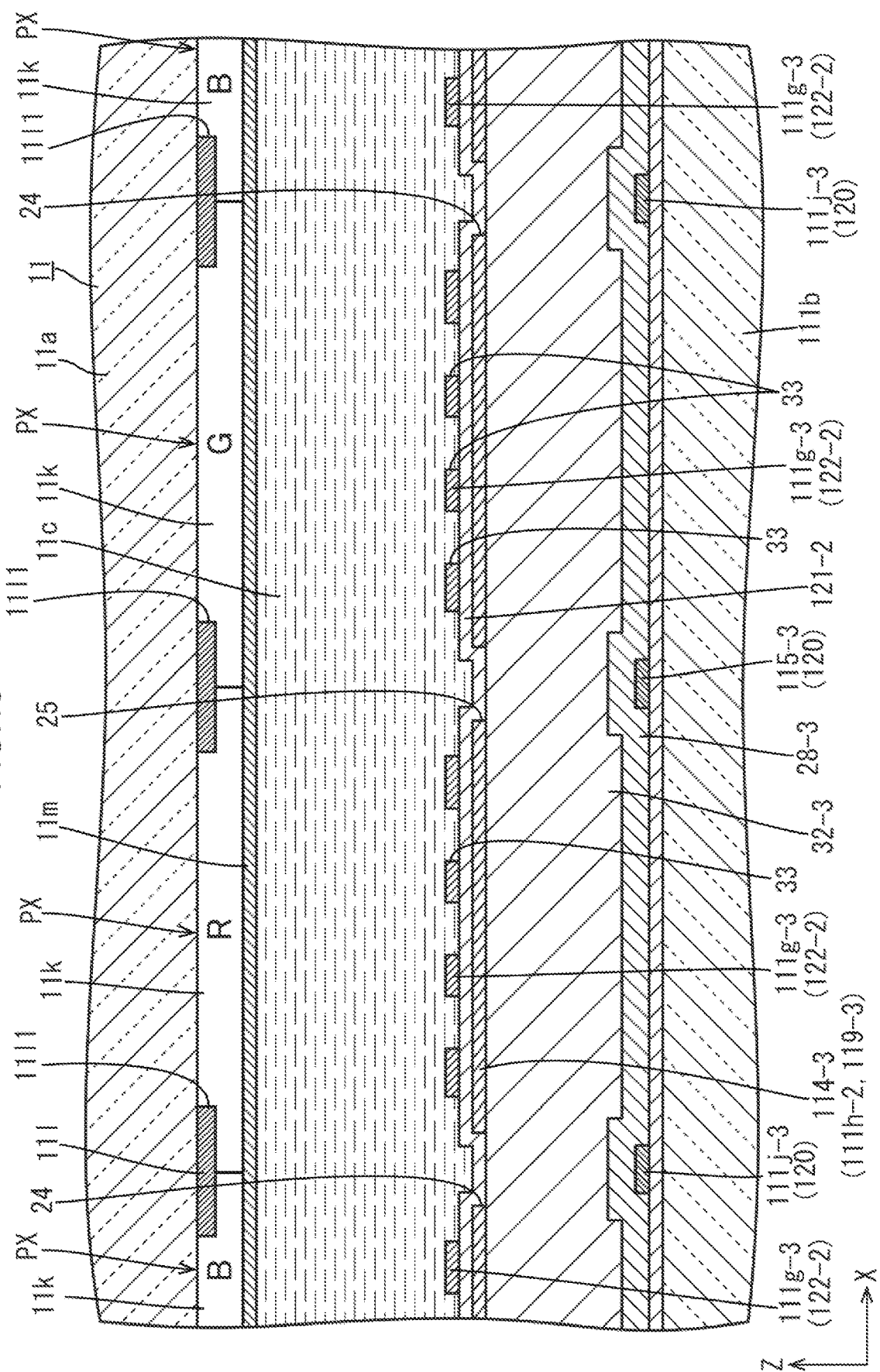
FIG. 18 is a cross-sectional view taken along the vicinity of the center of a pixel portion in a liquid crystal panel according to another embodiment (3) of the present invention.

(3) As a third modification of the second embodiment described above, as illustrated in FIG. 18, a planarizing film 32-3 may be added to the configuration of the second modification of (2) described above. The planarizing film 32-3 is similar to described in the first modification of (1) described above, and is interposed between an interlayer insulating film 28-3 and a first transparent electrode film 119-3. According to such a configuration, since a larger interval is provided between a source line 111*j*-3 and a touch line 115-3, and a pixel electrode 111*g*-3 or a touch electrode 114-3, sensitivity and display quality related to position detection are further improved.

Figure 19:
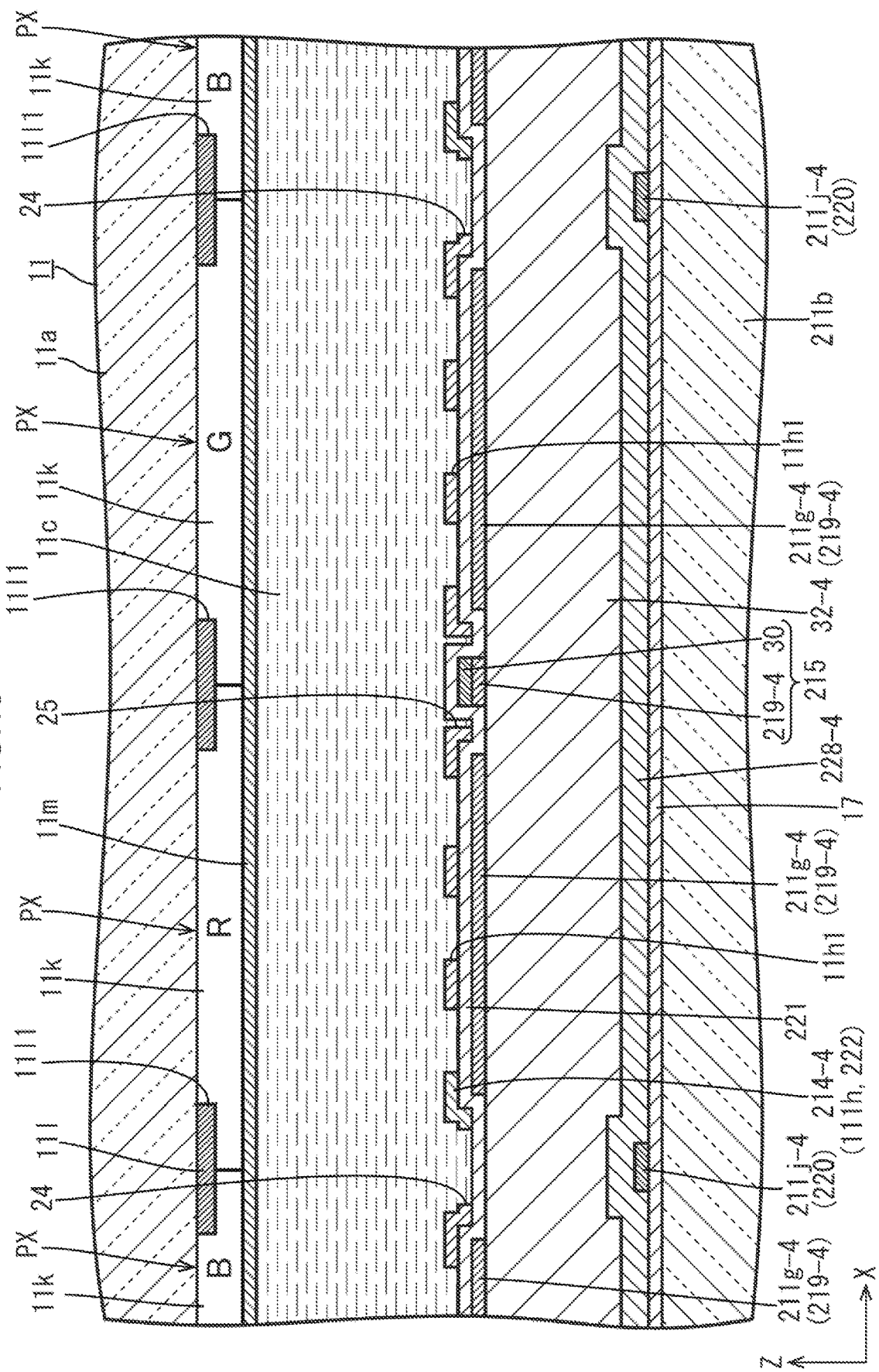
FIG. 19 is a cross-sectional view taken along the vicinity of the center of a pixel portion in a liquid crystal panel according to another embodiment (4) of the present invention.

(4) As a fourth modification of the third embodiment described above, as illustrated in FIG. 19, a planarizing film 32-4 may be added between an interlayer insulating film 228-4 and a first transparent electrode film 219-4. The planarizing film 32-4 is similar to that described in the first modification of (1) described above. According to such a configuration, since a larger interval is provided between a gate line (not illustrated) and a source line 211*j*-4, and a pixel electrode 211*g*-4 or a touch electrode 214-4, sensitivity and display quality related to position detection are further improved.

(5) As a fifth modification of the fourth embodiment described above, as illustrated in FIG. 20, a planarizing film 32-5 may be added between an interlayer insulating film 328-5 and a first transparent electrode film 319-5. The planarizing film 32-5 is similar to that described in the first modification of (1) described above. According to such a configuration, since a larger interval is provided between a gate line (not illustrated) and a source line 311*j*-5, and a pixel electrode 311*g*-5 or a touch electrode 314-5, sensitivity and display quality related to position detection are further improved.

(6) As a modification of the first embodiment described above, it is possible to adopt a configuration in which a source line and a touch line are composed only of a second metal film.

(7) As a modification of the first embodiment described above, arrangements of circuits for outputting image signals and circuits for outputting touch signals in a driver can be appropriately changed, and leading routes of source lead lines and touch lead lines can be appropriately changed according to the change in the arrangement.

(8) As a modification of the third embodiment described above, it is possible to adopt a configuration in which a touch line is composed only of a third metal film.

(9) As a modification of the fourth embodiment described above, it is possible to adopt a configuration in which a second touch line is composed only of a third metal film.

(10) As a modification of the fourth embodiment described above, it is possible to omit a third metal film. In that case, a second touch line is composed only of a first transparent electrode film.

(11) In the configurations described in the first, third, fourth, and fifth embodiments, the technical items described in the second modification of (2) described above are applied, and arrangements of the common electrode and the touch electrode, and the pixel electrode can be switched with each other.

(12) In each of the embodiments described above, a case where line widths of the source line and the touch line are the same as each other has been described, but the line widths of the source line and the touch line can also be different from each other.

(13) In each of the embodiments described above, a case where the source line overlapping opening and the touch line overlapping opening are arranged to so as to be aligned with each other in the Y-axis direction has been described, the source line overlapping opening and the touch line overlapping opening may be arranged so as to be offset from each other in the Y-axis direction. In addition, length dimensions of the source line overlapping opening and the touch line overlapping opening in the Y-axis direction or width dimensions of the source line overlapping opening and the touch line overlapping opening in the X-axis direction may be different from each other.

(14) In addition to each of the embodiments described above, a specific plane arrangement of the contact hole for connecting the touch electrode and the touch line to each other can be appropriately changed.

(15) Of course, it is possible to suitably combine the technical items described in each of the embodiments described above with each other.

(16) In each of the embodiments described above, a case where the source lines and the touch lines extend substantially straightly along the Y-axis direction has been described, but the source lines and the touch lines may also have an oblique extending portion that partially extends along an oblique direction with respect to the Y-axis direction. In that case, a part (long side portion) of an external shape of the pixel electrode can be parallel to the oblique extending portion.

(17) In each of the embodiments described above, a case where the light blocking portion is provided on a side of the CF substrate has been described, but the light blocking portion may also be provided on a side of the array substrate.

(18) In addition to each of the embodiments described above, the semiconductor film constituting the channel portion of the TFT may also be formed of polysilicon. In that case, the TFT is preferably a bottom gate type TFT.

(19) In each of the embodiments described above, a case where the touch panel pattern is configured in the self-capacitance manner has been described, but the touch panel pattern may also be configured in a mutual capacitance manner.

(20) In each of the embodiments described above, the transmissive liquid crystal panel has been exemplified, but the present invention can also be applied to a reflective liquid crystal panel or a transflective liquid crystal panel.

(21) In each of the embodiments described above, a case where the plane shape of the liquid crystal display device (the liquid crystal panel or the backlight device) is the vertically long rectangular shape has been described, but the plane shape of the liquid crystal display device may also be a horizontally long rectangular shape, a square shape, a circular shape, a semicircular shape, an oval shape, an ellipsoidal shape, a trapezoidal shape, or the like.

(22) In each of the embodiments described above, the liquid crystal panel having a configuration in which the liquid crystal layer is sandwiched between the pair of substrates has been described, but the present invention can also be applied to a display panel in which functional organic molecules other than the liquid crystal material is sandwiched between the pair of substrates.

EXPLANATION OF SYMBOLS

10: Liquid crystal display device (Display device with position input function)
11*f*, 11*f*: TFT (Switching component)
11*g*, 111*g*, 111*g*-1, 111*g*-2, 111*g*-3, 211*g*, 211*g*-4, 311*g*, 311*g*-5: Pixel electrode
11*h*, 111*h*, 111*h*-2: Common electrode 11h2: Partition opening
11i, 311i: Gate line (Scan line)
11j, 111j, 111j-1, 111j-2, 111j-3, 211j, 211j-4, 311j, 311j-5: Source line (Signal line)
12, 412: Driver (Driving circuit portion)
14, 114, 114-1, 114-2, 114-3, 214, 214-4, 314, 314-5, 414: Touch electrode (Position detection electrode)
15, 115, 115-1, 115-3, 215, 315, 415: Touch line (Position detection line)
19, 119, 119-1, 119-2, 119-3, 219, 219-4, 319, 319-5: First transparent electrode film (Conductive film, Transparent electrode film)
20, 120, 220, 320: Second metal film (Conductive Film, Metal film)
21, 121, 121-1, 121-2, 221, 321: Inter-transparent electrode film insulating film
22, 122, 122-2, 222, 322: Second transparent electrode film
23, 123, 223, 323: Contact hole
24: Source line overlapping opening (Signal line overlapping opening)
25: Touch line overlapping opening (Position detection line overlapping opening)
26, 426: Source lead line (Signal lead line)
27, 427: Touch lead line (Position detection lead line)
28, 28-1, 28-2, 28-3, 228, 228-4, 328, 328-5: Interlayer insulating film
31: Touch line contact hole (Contact hole)
315A: First touch line (First position detection line)
315B: Second touch line (Second position detection line)
AA: Display area
NAA: Non-display area

The invention claimed is:

1. A display device comprising:
pixel electrodes arranged along a first direction and a second direction perpendicular to the first direction, the pixel electrodes including a first pixel electrode and a second pixel electrode that are adjacent to each other in the second direction, and a third pixel electrode that is adjacent to the second pixel electrode in the first direction;
a common electrode overlapping the pixel electrodes such that a first insulating film is between the common electrode and the pixel electrodes;
a line extending in the first direction and contacted with the common electrode, the line including a first side edge and a second side edge that is an opposite side edge from the first side edge with respect to the second direction, the first side edge and the second side edge extending in the first direction;
image signal lines extending in the first direction to transmit image signals to the pixel electrodes, the image signal lines including a first image signal line opposite the first side edge of the line and a second image signal line opposite the second side edge of the line;
scan lines extending in the second direction to transmit scan signals, the scan lines including a first scan line and a second scan line, the first scan line and the second scan line being arranged at an interval in the first direction, a section of the first scan line and a section of the second scan line being in a space between the second pixel electrode and the third pixel electrode;
a first gate electrode protruding from the first scan line in the first direction to be away from the interval;
a second gate electrode protruding from the second scan line in the first direction to be away from the interval; and
thin film transistors coupled to each of the pixel electrodes, the image signal lines, and the scan lines, the thin film transistors including a first thin film transistor coupled to the first pixel electrode, a second thin film transistor coupled to the second pixel electrode, and a third thin film transistor coupled to the third pixel electrode, wherein
the first pixel electrode is between the line and the first image signal line, and the second pixel electrode and the third pixel electrode are between the line and the second image signal line.

2. The display device according to claim 1, wherein the first gate electrode is coupled to the first thin film transistor and the second gate electrode is coupled to the third thin film transistor.

3. The display device according to claim 1, wherein the first scan line and the second scan line extend straight along the second direction.

4. The display device according to claim 1, further comprising an insulating layer including a first opening, the insulating layer being between the common electrode and the line, wherein
the common electrode is connected to the line via the first opening.

5. The display device according to claim 4, wherein at least a part of the first opening is between the first scan line and the second scan line.

6. The display device according to claim 4, wherein the insulating layer includes the first insulating film.

7. The display device according to claim 1, further comprising:
a first drain electrode connecting the first thin film transistor and the first pixel electrode; and
a second drain electrode connecting the second thin film transistor and the second pixel electrode, wherein
the first drain electrode, the second drain electrode, the image signal lines, and the line are made of same metal.

8. The display device according to claim 1, wherein the line is supplied with a reference potential signal.

9. The display device according to claim 1, further comprising a gate insulating film covering the scan lines, wherein
at least one of the pixel electrodes is directly in contact with the gate insulating film.

10. The display device according to claim 9, further comprising a drain electrode connecting one of the thin film transistors and one of the pixel electrodes, wherein
the one of the pixel electrodes is between the gate insulating film and the drain electrode.

11. The display device according to claim 1, further comprising a drain electrode connecting one of the thin film transistors and one of the pixel electrodes, wherein
the one of the pixel electrodes is disposed above the drain electrode.

12. The display device according to claim 11, further comprising a second insulating film including a second opening, the second insulating film being between the pixel electrodes and the drain electrode, wherein
the one of the pixel electrodes is contacted with the drain electrode via the second opening.

13. The display device according to claim 1, wherein the common electrode includes a pixel overlapping opening, the pixel overlapping opening overlaps one of the pixel electrodes, and the pixel overlapping opening is elongated in a longitudinal direction of the pixel electrode.

14. The display device according to claim 1, wherein the common electrode includes a signal line overlapping opening, and the signal line overlapping opening overlaps at least a portion of one of the image signal lines.

15. The display device according to claim 1, wherein the common electrode forms a capacitance with a position input body with which position input is performed to detect a position of the position input performed with the position input body.

* * * * *